(12) United States Patent
Su

(10) Patent No.: US 10,881,944 B2
(45) Date of Patent: Jan. 5, 2021

(54) SKATEBOARD WITH VARIABLE-RATE ELASTOMERIC STEERING CONTROL SPRING

(71) Applicant: SOLID DESIGN & MFG. CORP., LTD., Taipei (TW)

(72) Inventor: Yuche Su, Taipei (TW)

(*) Notice: Subject to any disclaimer, the term of this patent is extended or adjusted under 35 U.S.C. 154(b) by 73 days.

(21) Appl. No.: 15/903,875

(22) Filed: Feb. 23, 2018

(65) Prior Publication Data

US 2018/0178110 A1 Jun. 28, 2018

Related U.S. Application Data

(63) Continuation-in-part of application No. 15/215,596, filed on Jul. 21, 2016, now Pat. No. 9,901,807.

(51) Int. Cl.
*A63C 17/00* (2006.01)
*A63C 17/01* (2006.01)
*B32B 7/02* (2019.01)

(52) U.S. Cl.
CPC ........ *A63C 17/012* (2013.01); *A63C 17/0046* (2013.01); *A63C 17/017* (2013.01); *B32B 7/02* (2013.01)

(58) Field of Classification Search
CPC .......................... A63C 17/012; A63C 17/0046
USPC ............................. 280/87.042, 11.28; 16/2.5
See application file for complete search history.

(56) References Cited

U.S. PATENT DOCUMENTS

| 3,862,763 | A | * | 1/1975 | Ware | A63C 17/02 |
| | | | | | 280/11.28 |
| 4,047,725 | A | * | 9/1977 | Pinchock | A63C 17/0046 |
| | | | | | 280/11.28 |
| 4,071,256 | A | * | 1/1978 | Kimmell | A63C 17/01 |
| | | | | | 280/11.28 |
| 4,166,629 | A | * | 9/1979 | List | A63C 17/012 |
| | | | | | 280/11.28 |
| 4,194,752 | A | * | 3/1980 | Tilch | A63C 17/01 |
| | | | | | 280/11.28 |
| 4,245,848 | A | * | 1/1981 | Dudouyt | A63C 17/01 |
| | | | | | 280/11.28 |

(Continued)

*Primary Examiner* — Jeffrey J Restifo
(74) *Attorney, Agent, or Firm* — Anderson Law Group LLC; Margaret Anderson

(57) ABSTRACT

A skateboard and a variable-rate elastomeric steering control spring include a boardside unitary body formed of an exterior first elastomer having a first durometer on the Shore "A" scale, and an interior second elastomer coupled to the first elastomer and extending at least length of the exterior first elastomer, the second elastomer having a second durometer on the Shore "A" scale and a through hole disposed to receive a kingpin of the skate truck; a roadside unitary body formed of an exterior third elastomer having a third durometer on the Shore "A" scale, and an interior fourth elastomer coupled to the third elastomer and extending at least a length of the exterior third elastomer, the interior fourth elastomer having a fourth durometer on the Shore "A" scale and a through hole disposed to receive the kingpin; and wherein the first, second, third and fourth elastomers comprise at least two durometers on the Shore "A" scale between 65 A and 100 A to enable the boardside unitary body and the roadside unitary body to form the variable-rate elastomeric steering control spring when disposed on the kingpin of the skate truck.

20 Claims, 21 Drawing Sheets

(56) References Cited

U.S. PATENT DOCUMENTS

| | | | | |
|---|---|---|---|---|
| 4,251,087 | A * | 2/1981 | Hansen | A63C 17/01 280/11.28 |
| 4,311,319 | A * | 1/1982 | Snyder | A63C 17/02 280/11.28 |
| 4,398,734 | A * | 8/1983 | Barnard | A63C 17/01 280/11.28 |
| 5,286,014 | A * | 2/1994 | Chakko | F16F 7/06 267/293 |
| 5,853,182 | A * | 12/1998 | Finkle | A63C 17/01 280/87.042 |
| 5,879,013 | A * | 3/1999 | Shih | A63C 17/01 280/11.28 |
| 6,082,721 | A * | 7/2000 | Kingsley | F16B 11/008 267/276 |
| 6,182,987 | B1 * | 2/2001 | Bryant | A63C 17/0093 280/11.28 |
| 6,315,304 | B1 * | 11/2001 | Kirkland | A63C 17/01 280/11.28 |
| 6,367,819 | B1 * | 4/2002 | Andersen | A63C 17/0093 280/11.27 |
| 6,443,471 | B1 * | 9/2002 | Mullen | A63C 17/01 280/87.042 |
| 6,467,782 | B1 * | 10/2002 | Smith | A63C 17/01 280/11.28 |
| 6,474,666 | B1 * | 11/2002 | Andersen | A63C 17/0093 280/11.28 |
| 6,619,639 | B1 * | 9/2003 | Shelley | B60G 7/008 267/292 |
| 6,670,021 | B2 * | 12/2003 | Schroder | F16C 33/043 138/145 |
| 6,739,603 | B1 * | 5/2004 | Powell | A63C 17/0093 280/11.27 |
| 7,104,558 | B1 * | 9/2006 | Saldana | A63C 17/0093 280/11.27 |
| 7,897,241 | B2 * | 3/2011 | Rice | C08J 5/044 16/2.1 |
| 7,984,917 | B2 * | 7/2011 | Lake | A63C 17/0046 280/11.27 |
| 8,328,206 | B2 * | 12/2012 | Williams, Jr. | A63C 17/0093 280/11.27 |
| 8,998,225 | B2 * | 4/2015 | Magee | A63C 17/012 280/87.042 |
| 9,010,777 | B2 * | 4/2015 | Braden | A63C 17/012 280/11.28 |
| 9,145,030 | B2 * | 9/2015 | Williams | B60B 35/025 |
| 9,604,123 | B2 * | 3/2017 | Tolman | A63C 17/012 |
| 9,901,807 | B2 * | 2/2018 | Su | A63C 17/012 |
| 2001/0038187 | A1 * | 11/2001 | Reyes | A63C 17/01 280/87.042 |
| 2004/0145142 | A1 * | 7/2004 | Wang | A63C 17/0093 280/87.042 |
| 2004/0207169 | A1 * | 10/2004 | Kent | A63C 17/0093 280/87.042 |
| 2004/0245738 | A1 * | 12/2004 | Inchley | A63C 17/0093 280/87.042 |
| 2006/0061054 | A1 * | 3/2006 | Grossman | A63C 17/0046 280/87.042 |
| 2006/0097470 | A1 * | 5/2006 | Chmelar | A63C 17/0093 280/87.042 |
| 2007/0164530 | A1 * | 7/2007 | Horn | A63C 17/0093 280/87.042 |
| 2009/0256324 | A1 * | 10/2009 | Lake | A63C 17/0046 280/87.042 |
| 2013/0270781 | A1 * | 10/2013 | Kuyt | A63C 17/012 280/11.28 |
| 2014/0131966 | A1 * | 5/2014 | Magee | A63C 17/012 280/86 |
| 2014/0151972 | A1 * | 6/2014 | Williams | B60B 35/025 280/87.042 |
| 2015/0061252 | A1 * | 3/2015 | Lininger, Jr. | A63C 17/012 280/87.042 |
| 2015/0145226 | A1 * | 5/2015 | Tolman | A63C 17/012 280/87.042 |
| 2015/0209652 | A1 * | 7/2015 | Magee | A63C 17/012 280/86 |
| 2016/0023086 | A1 * | 1/2016 | Aamodt | A63C 17/015 280/87.042 |
| 2018/0021665 | A1 * | 1/2018 | Su | A63C 17/017 280/11.28 |
| 2018/0178110 | A1 * | 6/2018 | Su | A63C 17/012 |

* cited by examiner

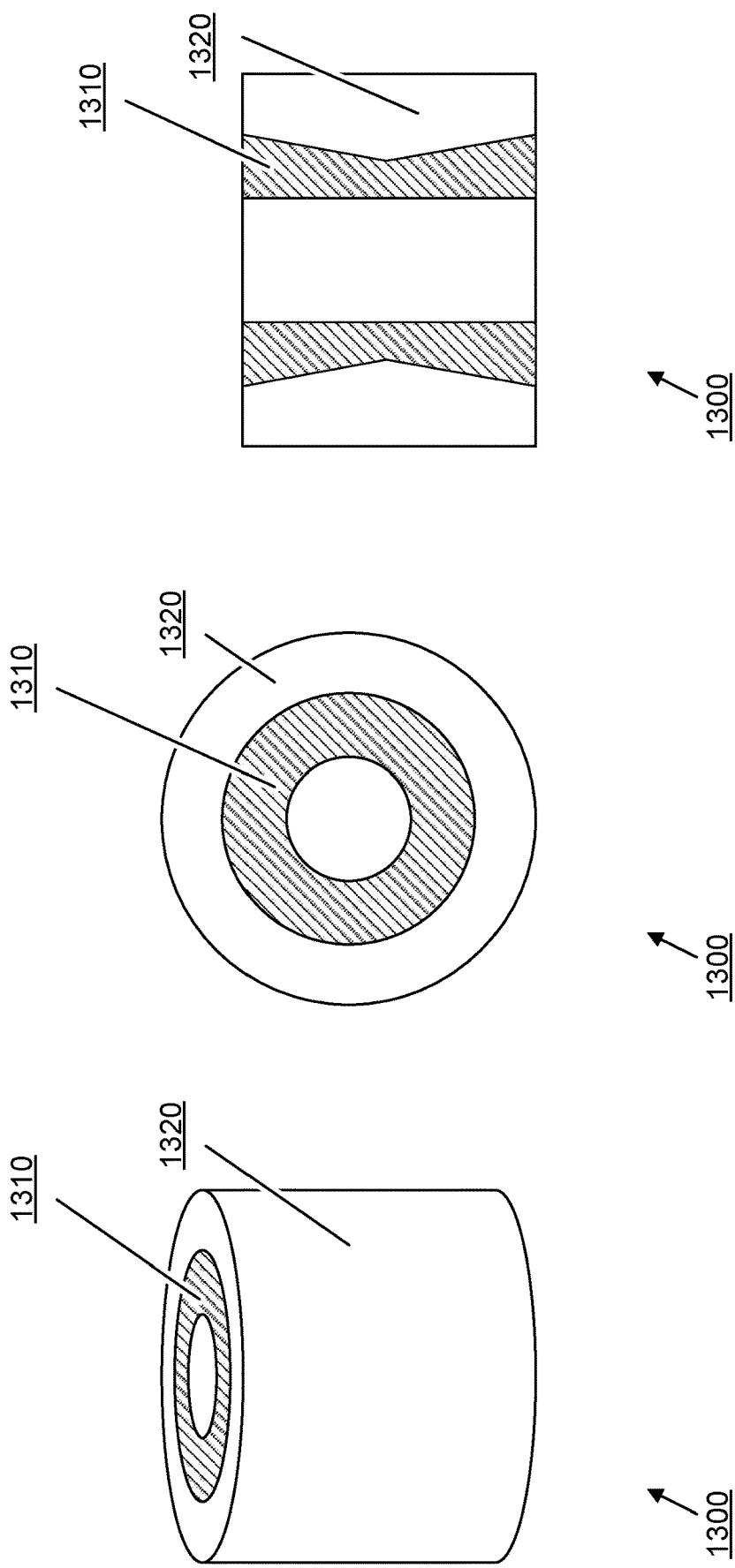

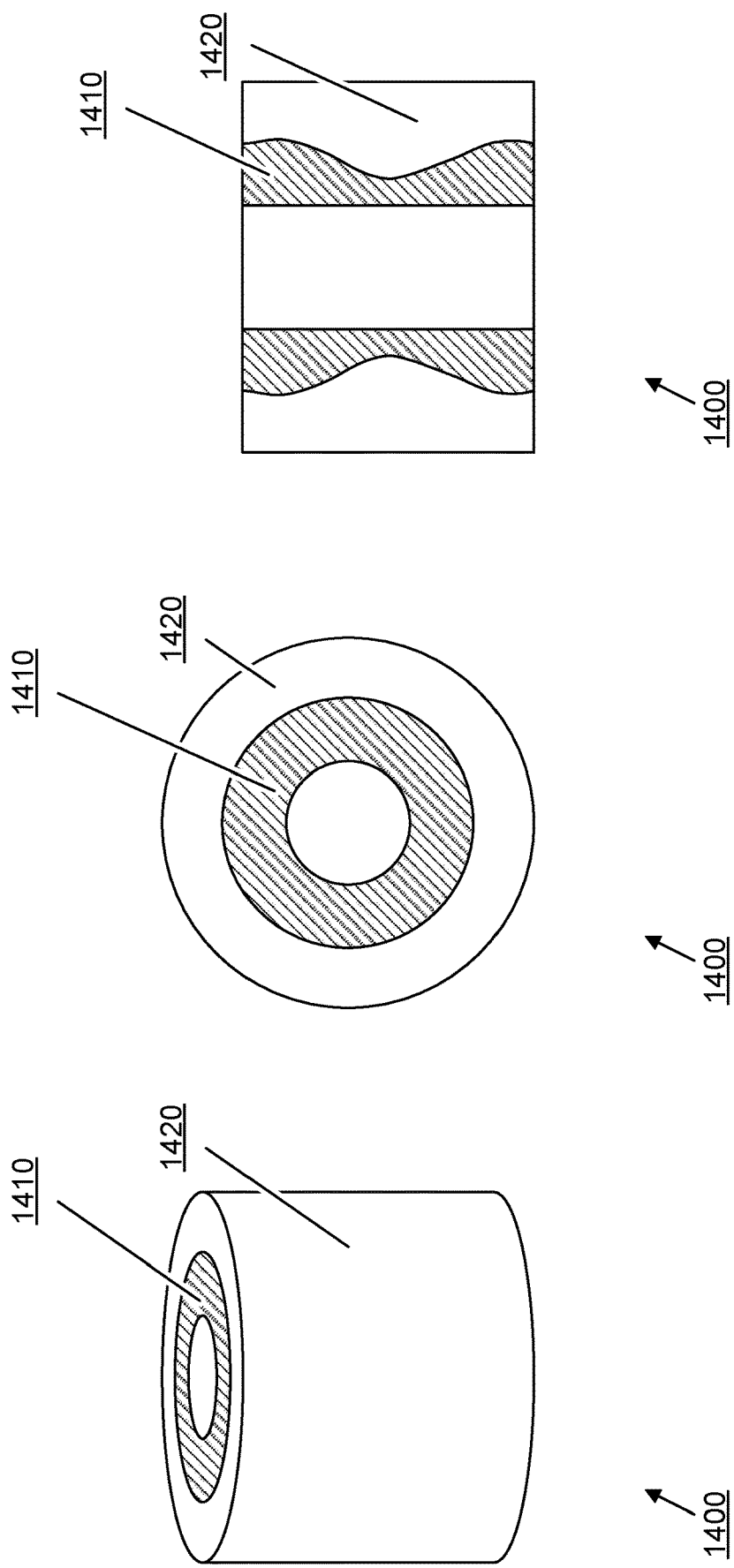

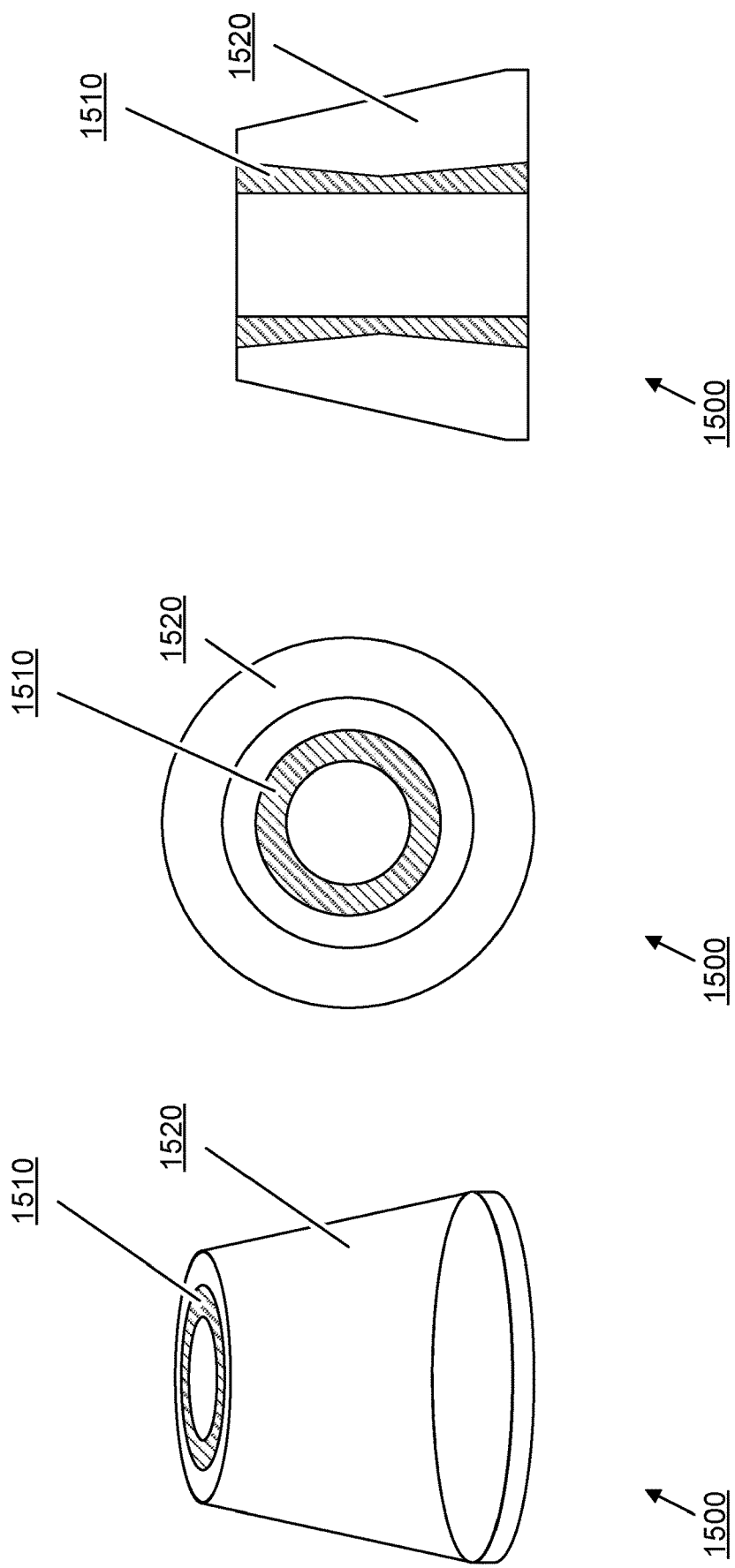

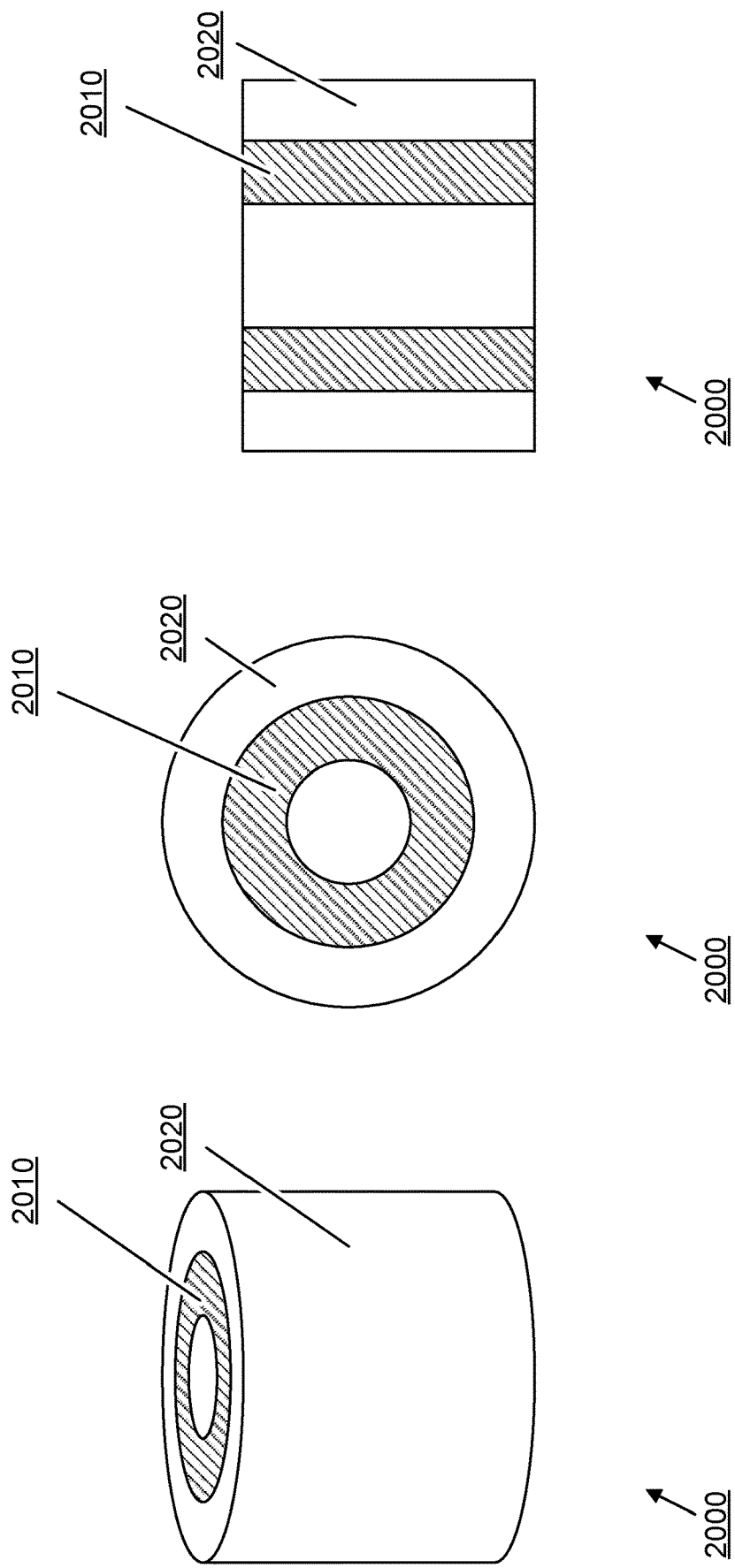

SKATEBOARD WITH VARIABLE-RATE ELASTOMERIC STEERING CONTROL SPRING

CROSS-REFERENCE TO RELATED APPLICATION

This is a continuation-in-part of co-pending U.S. patent application Ser. No. 15/215,596, titled "SHOCK-ABSORBING BUSHING OF SKATEBOARD" filed on Jul. 21, 2016, which is hereby incorporated by reference in its entirety.

FIELD OF INVENTION

This invention relates generally to the field of skateboards and skateboard assemblies.

BACKGROUND INFORMATION

A skateboard is a carrying structure. Competition-level skateboarding includes bowl riding, freestyle, slalom racing, streetstyle, ramp riding and downhill racing. Advanced skaters have performance requirements reflected in the assemblies of the trucks and other component parts of a skateboard. Advanced skaters and novice skaters alike may execute various difficult moves or actions, such as turning in air, for purposes of exhibition or competition.

The most commonly known skateboard structure includes a board with two skate trucks with baseplates mounted to an underside and each of the baseplates having a kingpin mounted thereto to support an axle hanger so that the entire structure can support a skater.

The kingpin of the baseplate is often additionally provided with an elastomeric spring, which is also referred to as a bushing in the field. Such an elastomeric spring or bushing absorbs shocks and vibrations and resiliently opposes leaning forces so as to provide steering control and return-to-center force at the end of turns.

The conventional skateboard is imperfect with respect to turning control and shock damping. Further improvement is needed.

SUMMARY

An object of the present invention is to provide a steering-control spring of a skateboard with at least two plastic/elastomeric materials having different values of hardness for absorbing an impact force or a vibration force and providing finely-tuned steering control.

Embodiments herein provide for a variable-rate elastomeric steering control spring for a skate truck, including a boardside unitary body formed of an exterior first elastomer having a first durometer on the Shore "A" scale, and an interior second elastomer coupled to the first elastomer and extending at least the length of the exterior first elastomer, the second elastomer having a second durometer on the Shore "A" scale and a through hole disposed to receive a kingpin of the skate truck, and a roadside unitary body formed of an exterior third elastomer having a third durometer on the Shore "A" scale, and an interior fourth elastomer coupled to the third elastomer and extending at least the length of the exterior third elastomer, the interior fourth elastomer having a fourth durometer on the Shore "A" scale and a through hole disposed to receive the kingpin, and wherein the first, second, third and fourth elastomers comprise at least two durometers on the Shore "A" scale between 65 A and 100 A to enable the boardside unitary body and the roadside unitary body to form the variable-rate elastomeric steering control spring when disposed on the kingpin of the skate truck.

In one embodiment, the variable-rate elastomeric steering control spring is part of the skate truck including a seat to receive a distal end of the boardside unitary body and a proximal end of the roadside unitary body and allow for compression of the variable-rate elastomeric steering control spring.

In one embodiment, the variable-rate elastomeric steering control spring has a boardside unitary body with a cylindrical shape and the roadside unitary body has a frustrum shape.

In another embodiment, the variable-rate elastomeric steering control spring has interior elastomers in both the boardside unitary bodies and the roadside unitary bodies that have shapes with cross-sections consisting of at least one of the following: hourglass, triangular, rectangular, semi-circular, asymmetric, and rhombus.

In one embodiment, the shape of the interior elastomer and exterior elastomers functionally affect turning control of the skate truck. In another embodiment, the boardside and roadside interior elastomer shapes provide a non-linear steering control profile for the skate truck.

In one embodiment, the variable-rate elastomeric steering control spring has first and third durometers that are between 85 A and 100 A of the Shore "A" scale; and the second and fourth durometers are between 65 A and 90 A of the Shore "A" scale.

In another embodiment, the variable-rate elastomeric steering control spring has first, second, third and fourth elastomers having four different durometers of between 65 A and 100 A of the Shore "A" scale. Alternatively, the variable-rate elastomeric steering control spring can have a boardside unitary body with a fifth elastomer disposed between the first and the second elastomers, the fifth elastomer having a durometer of between 65 A and 100 A of the Shore "A" scale.

In another embodiment, the roadside unitary body has a sixth elastomer disposed between the third and the fourth elastomers, the sixth elastomer having a durometer of between 65 A and 100 A of the Shore "A" scale.

Another embodiment is directed to a skateboard including a deck, at least two skate trucks coupled to the deck, each skate truck including an axle, a mounting bracket including a kingpin protruding down from the mounting bracket, the kingpin coupled to a variable-rate elastomeric steering control spring assembly. The variable elastomeric steering control spring can include a boardside unitary body formed of an exterior first elastomer having a first durometer on the Shore "A" scale, and an interior second elastomer coupled to the first elastomer and extending at least a length of the exterior first elastomer, the second elastomer having a second durometer on the Shore "A" scale and a through hole disposed to receive a kingpin of the skate truck, and a roadside unitary body formed of an exterior third elastomer having a third durometer on the Shore "A" scale, and an interior fourth elastomer coupled to the third elastomer and extending at least a length of the exterior third elastomer, the interior fourth elastomer having a fourth durometer on the Shore "A" scale and a through hole disposed to receive the kingpin wherein the first, second, third and fourth elastomers of the boardside unitary body and the roadside unitary body form the variable-rate elastomeric steering control spring when disposed on the kingpin of the skate truck.

In one embodiment, the at least two skate trucks of the skateboard include a seat to receive a distal end of the boardside unitary body and a proximal end of the roadside unitary body and allow for compression of the variable-rate elastomeric steering control spring.

In another embodiment of the skateboard, the boardside unitary body has a cylindrical shape and the roadside unitary body has a frustrum shape.

In another embodiment of the skateboard, the interior elastomers of both the boardside unitary bodies and the roadside unitary bodies have shapes with cross-sections consisting of at least one of the following shapes: hourglass, triangular, rectangular, circular, asymmetric, and rhombus.

In an embodiment, the shape of the interior elastomer and exterior elastomers functionally affects the turning control profile of the skateboard. For example, the boardside and roadside interior elastomer shape can provide a non-linear resistance profile of the skate truck.

Another embodiment is directed to an apparatus including a roadside unitary body formed of an exterior elastomer having a durometer on the Shore "A" scale of between 65 A and 100 A, and an interior elastomer coupled to the exterior elastomer and extending at least a length of the exterior elastomer, the interior elastomer having a durometer on the Shore "A" scale between 65 A and 100 A and a through hole disposed to receive a kingpin for attaching the roadside unitary body to a skate truck for a skateboard, wherein the exterior and interior elastomers have at least two durometers on the Shore "A" scale between 65 A and 100 A to enable the roadside unitary body to form a variable-rate elastomeric steering control spring when disposed on the kingpin of the skate truck.

In one embodiment of the apparatus, the roadside unitary body is disposed on the kingpin of the skate truck as part of a variable-rate elastomeric steering control spring, wherein the spring includes: the roadside unitary body, and a boardside unitary body formed of the exterior elastomer and the interior elastomer coupled to the and extending at least a length of the exterior elastomer and having through hole disposed to receive the kingpin of the skate truck.

In one embodiment, either the roadside unitary body or the boardside unitary body is disposed on the kingpin of the skate truck and the interior elastomers of both the boardside unitary bodies and the roadside unitary bodies have shapes with cross-sections consisting of at least one of the following: hourglass, triangular, rectangular, semi-circular, asymmetric, and rhombus.

Beneficial efficacy of the disclosure herein is that a skateboard that involves the turning control spring of the present invention shows superiority in respect of steering mobility and control at various speeds.

In addition to the foregoing, other method aspects are described in the claims, drawings, and text forming a part of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIGS. 13A, 13B and 13C illustrate a particular implementation of a boardside unitary body showing interior elastomer geometric triangular symmetric narrowing 1310 in accordance with an embodiment of the present application.

FIGS. 14A, 14B and 14C illustrate a particular implementation of a boardside unitary body showing interior elastomer with an hourglass symmetric shape 1410 in accordance with an embodiment of the present application.

FIGS. 15A, 15B and 15C illustrate a particular implementation of a roadside unitary body showing another embodiment of triangular narrowed interior elastomer cross-section area 1510 in accordance with an embodiment of the present application.

FIGS. 20A, 20B and 20C illustrate an implementation of a boardside unitary body showing interior elastomer 2010 with rectangular cross-section in accordance with an embodiment of the present application.

DETAILED DESCRIPTION

Figure 1B:
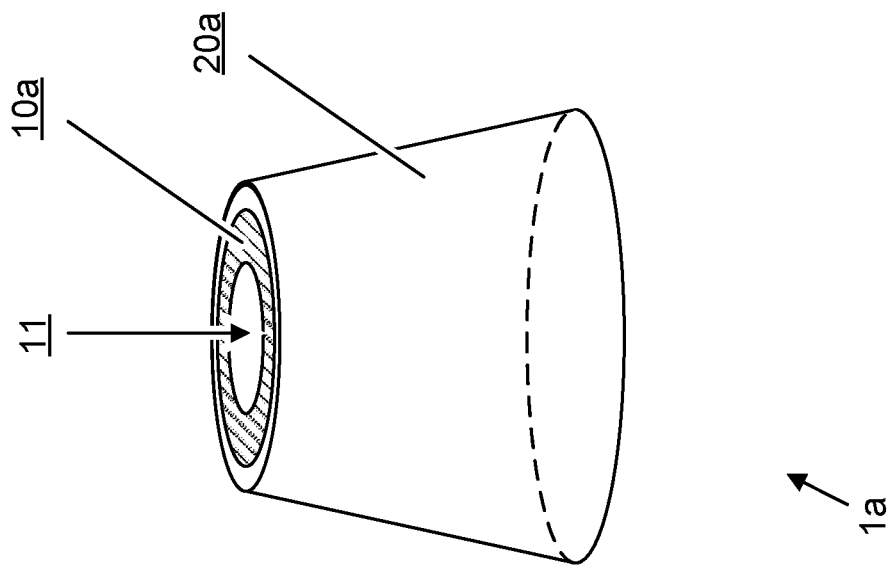
FIG. 1B illustrates perspective view of a roadside unitary body in accordance with an embodiment of the present application.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1A:
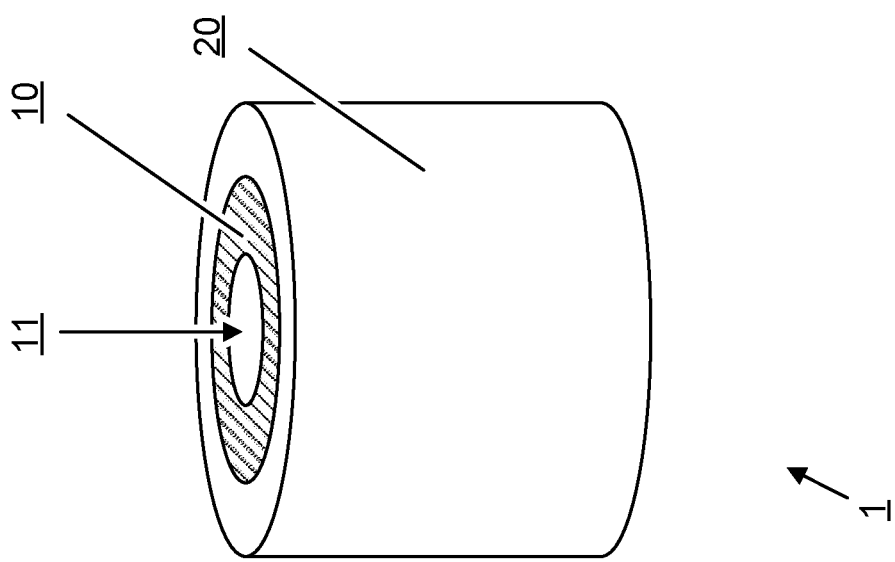
FIG. 1A illustrates perspective view of a boardside unitary body in accordance with an embodiment of the present application.
Figure 2:
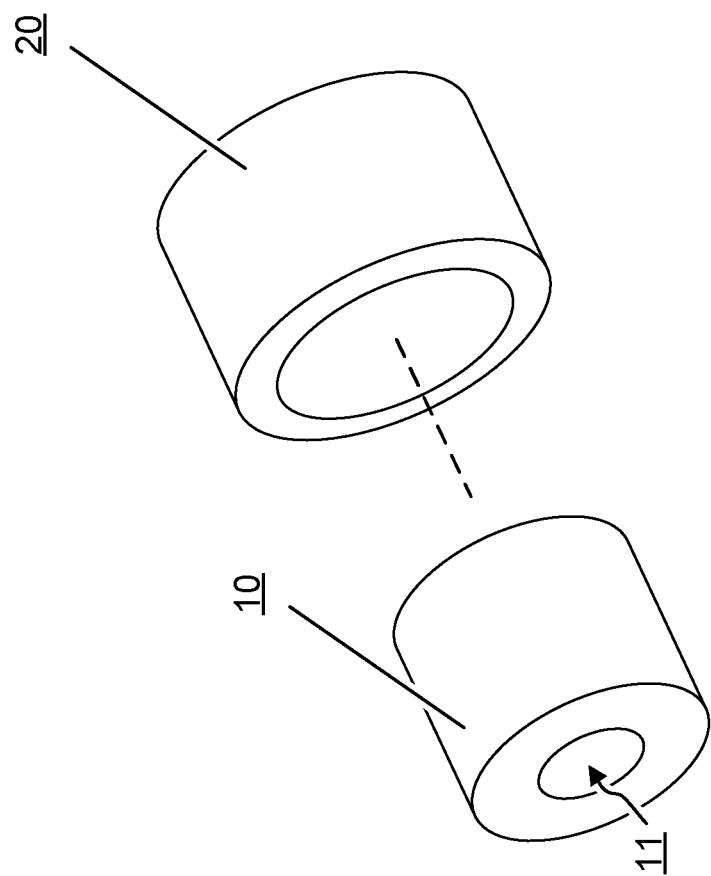
FIG. 2 illustrates an exploded view of a unitary body in accordance with an embodiment of the present application.
Figure 3:
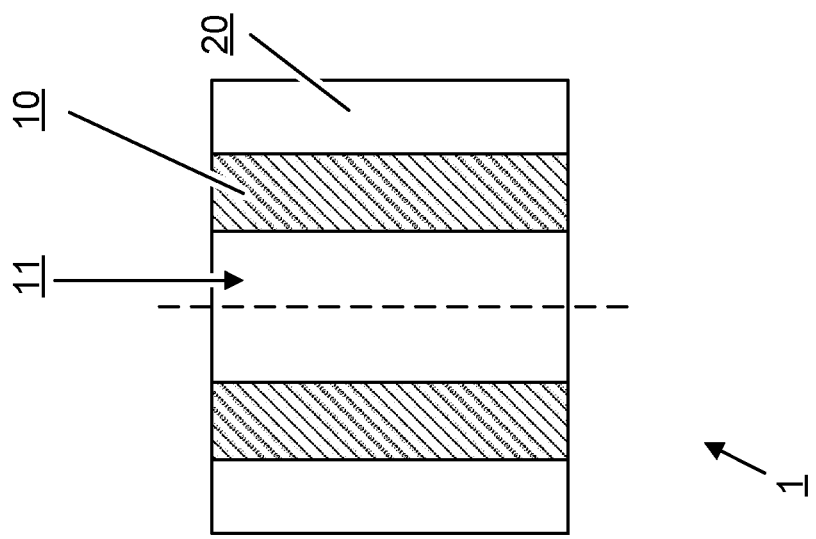
FIG. 3 is a cross-sectional implementation of a unitary body in accordance with an embodiment of the present application.
Figure 4:
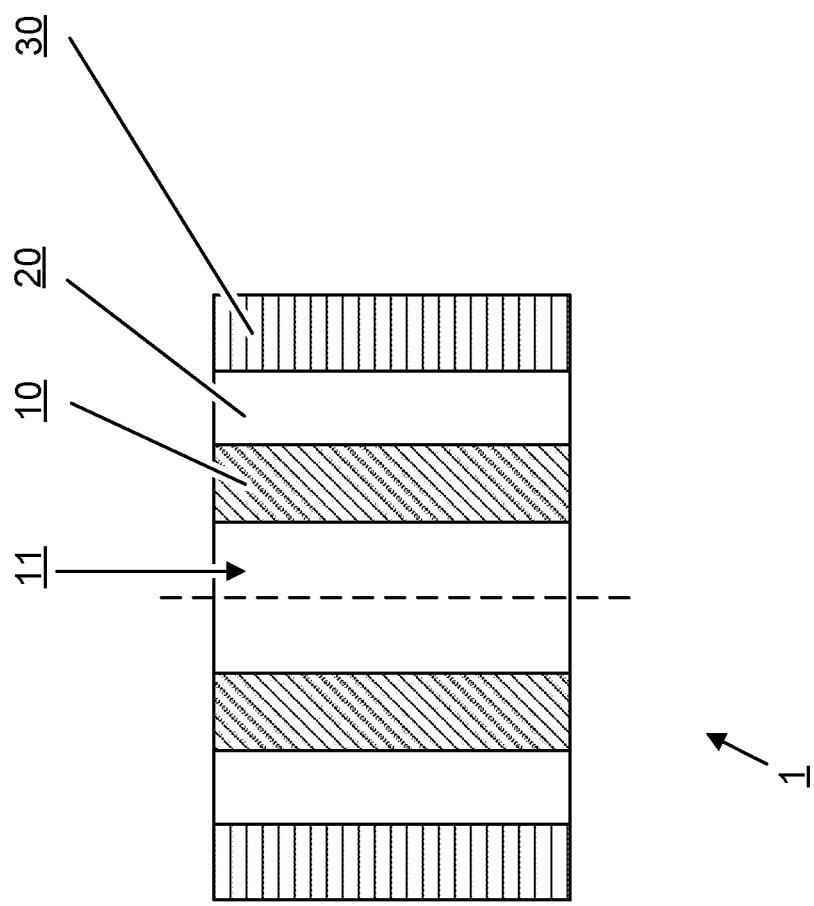
FIG. 4 illustrates a cross-sectional implementation of a unitary body in accordance with an alternate embodiment of the present application.

The present invention provides an elastic spring, also referred to as a "kingpin," having at least two elastomers with different durometers. Referring now to FIGS. 1A and 1B, a boardside and a roadside portion of a spring, respectively, are shown for use with a skateboard. FIG. 2 illustrates an exploded view of a boardside unitary body of the spring with the different component durometer elastomers 10 and 20 and hole 11. The at least two component durometers in embodiments herein combine to create a unitary body. FIGS. 3 and 4 illustrate cross sections of the boardside unitary body with multiple elastomers having different durometers and hole 11 for receiving a kingpin. FIG. 3 illustrates the two elastomers, an interior elastomer 10 and an exterior elastomer 20 and hole 11 for receiving a kingpin. FIG. 4 illustrates three elastomers, with two interior elastomers 10 and 20 and an exterior elastomer 30 and a hole for receiving a kingpin 11*a*.

Figure 5:
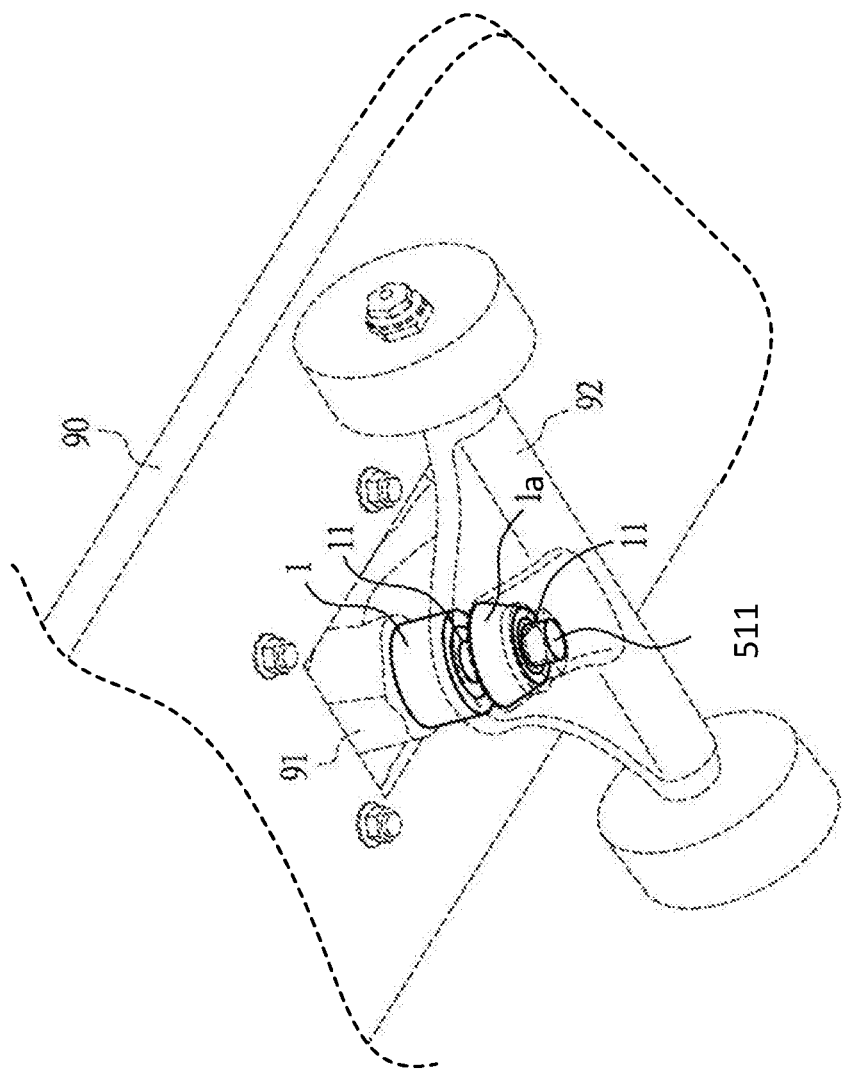
FIG. 5 illustrates a partial view of a skateboard in accordance with an embodiment of the present application.

Generally, a skateboard has an underside for attaching skate trucks. Referring to FIG. 5, a portion of a skateboard 500 is shown with deck 90 with a skate truck 91. A skateboard 500 includes two skate trucks 91 each with an axle hanger 92 mounted with kingpin 511 going through hole 11 and separating boardside unitary body 1 and roadside unitary body 1*a*

According to an embodiment, the elastic spring shown in FIG. 1A and FIG. 1B represent a variable-rate elastomeric steering control kingpin spring. Specifically, spring 1 shown in FIG. 1A includes a boardside unitary body 1 formed of an exterior first elastomer 20 having a first durometer on the Shore "A" scale, and an interior second elastomer 10 coupled to the first elastomer 20 and extending a length of the exterior first elastomer 20, the second elastomer 10 having a second durometer on the Shore "A" scale and a through hole 11 disposed to receive a kingpin in the skate truck.

FIG. 1B illustrates a roadside unitary body 1*a* formed of an exterior third elastomer 20*a* having a third durometer on the Shore "A" scale, and an interior fourth elastomer 10*a* coupled to the third elastomer 20*a* and extending at least a length of the exterior third elastomer 10*a*, and the interior fourth elastomer 10*a* having a through hole 11 disposed to receive the kingpin.

In an embodiment, the first 20, second 10, third 20*a* and fourth 10*a* elastomers include at least two durometers on the Shore "A" scale between 65 A and 100 A to enable the boardside unitary body and the roadside unitary body to form the variable-rate elastomeric steering control spring when disposed on the kingpin 511 of a skate truck. In one embodiment, the skate truck is one of two skate trucks on a skateboard. In another embodiment, the skate trucks are disposed as 4 skate trucks on skates.

According to an embodiment, the first, second, third and fourth elastomers can have at least two durometers on the Shore "A" scale between 65 A and 100 A to enable the boardside unitary body and the roadside unitary body to form the variable-rate steering control spring when disposed on the kingpin of the skate truck hanger.

In another embodiment, the first, second, third and fourth elastomers have different durometers such that a interior elastomer "sleeve" portion 10 and 10*a* can have a softer or harder durometers as compared to the exterior portion 20 and 20*a*.

In an embodiment, interior first elastomer and interior third elastomer 10 and 10*a* have a first durometer that is harder than second exterior elastomer 20 and fourth exterior elastomer 20*a*.

In one embodiment, elastomers 20 and 20*a* both have a second value of elastic resilience. The elastomers 10 and 10*a* can have a length that is at least the same as that of elastomers 20 and 20*a*.

The first layer elastomers 10 and 10*a* and the second layer elastomers 20 and 20*a* can be respectively made of elastic materials having different values of elastic resilience. The first and second elastomer layers 10 and 20 and elastomer layers 10*a* and 20*a* are respectively combined to form a two-part spring with a boardside unitary body and a roadside unitary body.

As shown in FIG. 5, boardside and the roadside unitary bodies are collectively mounted on kingpin 511 of each of the baseplate 91 such that one end of each of the two-part control spring 1 and 1*a* is set against and mates one of two opposite sides of the axle hanger 92 to have the axle hanger 92 fixed between the combined turning control spring 1 and 1*a* (boardside 1 and roadside 1*a* unitary bodies together forming control spring) and mounted on the kingpin 511 of the baseplate 91.

The combined roadside and boardside turning control spring 1 and 1*a* function to resist, with elasticity thereof, a turning force applied to the axle hanger 92 due to weight change during skateboarding conducted by a user and provides effects of nonlinear turning control and shock damping.

In an embodiment, the first layers shown in FIGS. 1A and 1B, 10 and 10*a* and the second layer 20 and 20*a* are selected from elastic materials and are combined together as a unitary body by means of one of pouring via injection molding.

In an embodiment, the first value of elastic resilience of the first layer 10 and 10*a* with a different durometer than the second value of elastic resilience of the second layer 20 and 20*a* so that the first layer 10 and 10*a* have flexibility higher than that of the second layers 20 and 20*a*.

In an embodiment, the first value of elastic resilience of the first layer 10 and 10*a* is higher than the second value of elastic resilience of the second layer 20 and 20*a* so that the first layer 10 and 10*a* have flexibility lower than that of the second layer 20 and 20*a*.

In an embodiment, the first value of elastic resilience of the first layer 10 and the second value of elastic resilience of the second layer are selected from specification of Shore "A". More particularly, in an embodiment, a first layer can be chosen from durometers having a range of 85 A to 100 A, and a second, softer layer can have durometers ranging from 65 A to 95 A.

In an embodiment, the first layer 10 and 10a and the second layer 20 and 20a are combined as a unitary body with elastic materials of different colors so that the turning control spring 1 is provided with multilayers of colors, shows enhanced aesthetics.

In an embodiment, the second layer 20 and 20a is structured to show an outside configuration that is of a conic shape or other different shapes to meet the needs for different installation conditions.

In an embodiment, the turning control spring 1 according to an embodiment further comprises a third layer. The third layer has a third value of elastic resilience. The third layer 30 is combined with an outside surface of the second layer 20 such that the first layer 10, the second layer 20, and the third layer 30, which can be formed of plastic and/or elastic materials, are combined together as a unitary body to exhibit three different values of elastic resilience.

FIGS. 6A, 6B, 6C through 21A, 21B and 21C illustrate different embodiments illustrating different shapes that can be implemented on a spring in accordance with embodiments. Thus, a variable-rate elastomeric steering control spring in accordance with embodiments can have interior elastomers of either or both the boardside unitary bodies and the roadside unitary bodies with shapes whose cross-sections consisting of at least one of the following: hourglass, triangular, rectangular, semi-circular, asymmetric, and rhombus. Each cross-section combines different durometer elastomers to advantageously provide steering control, as explained in more detail below.

Figure 6C:
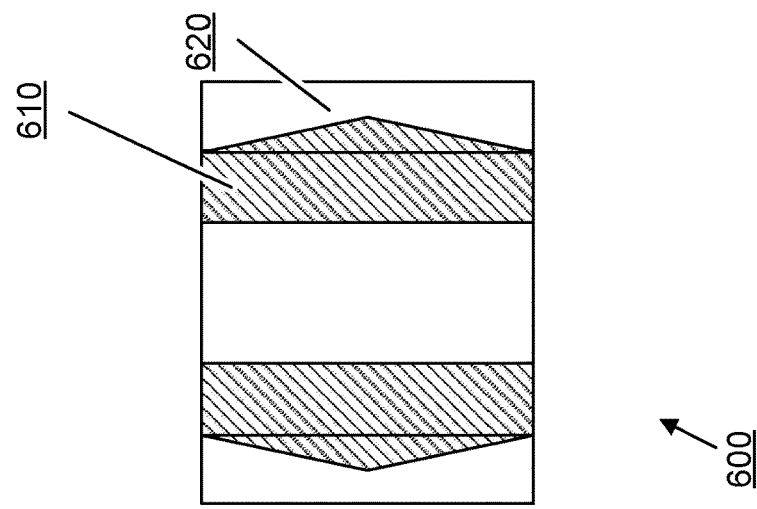
FIGS. 6A, 6B and 6C illustrate a particular implementation of a boardside unitary body showing interior elastomer with a triangular geometrically widened area 610 in accordance with an embodiment of the present application.
Figure 6B:
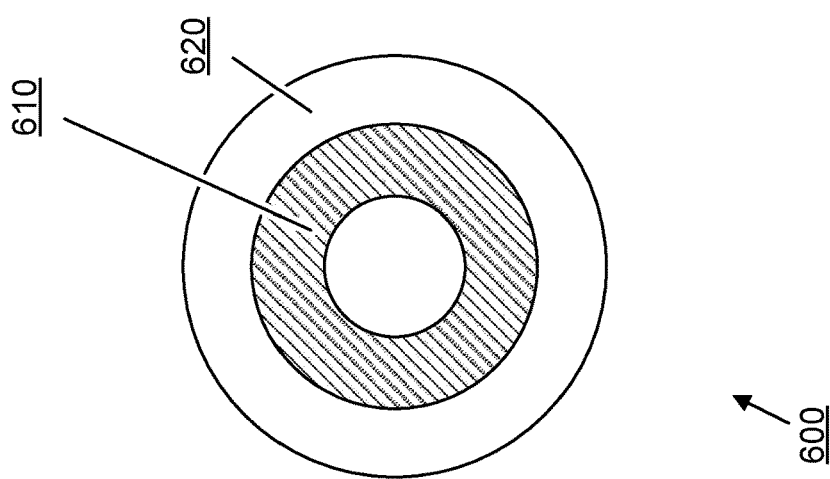
Figure 6A:
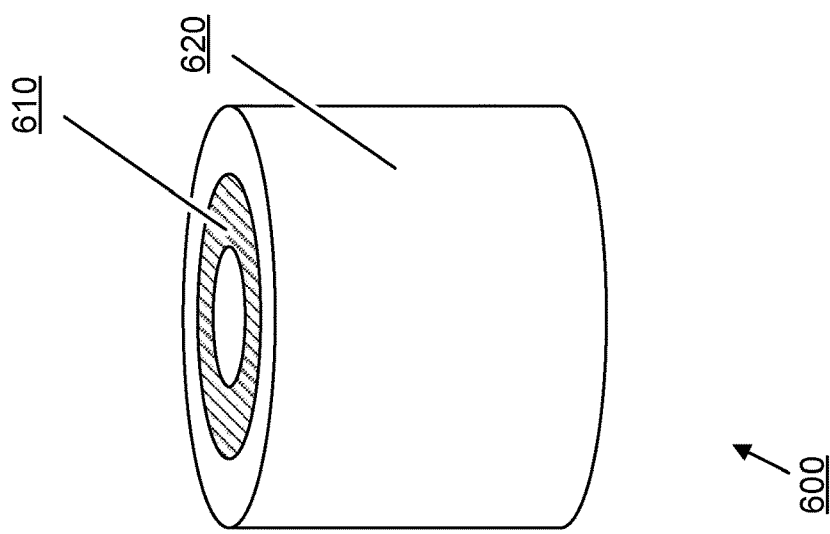
Figure 7C:
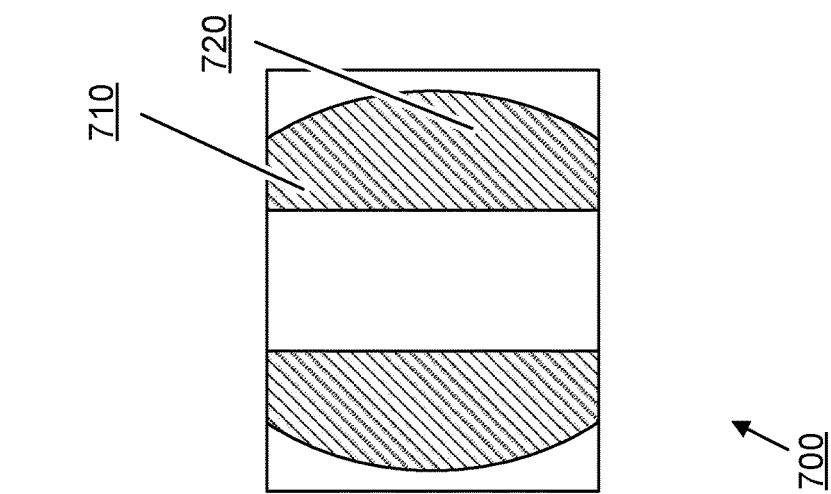
FIGS. 7A, 7B and 7C illustrate a particular implementation of a boardside unitary body showing interior elastomer semi-circular widening 710 in accordance with an embodiment of the present application.
Figure 7B:
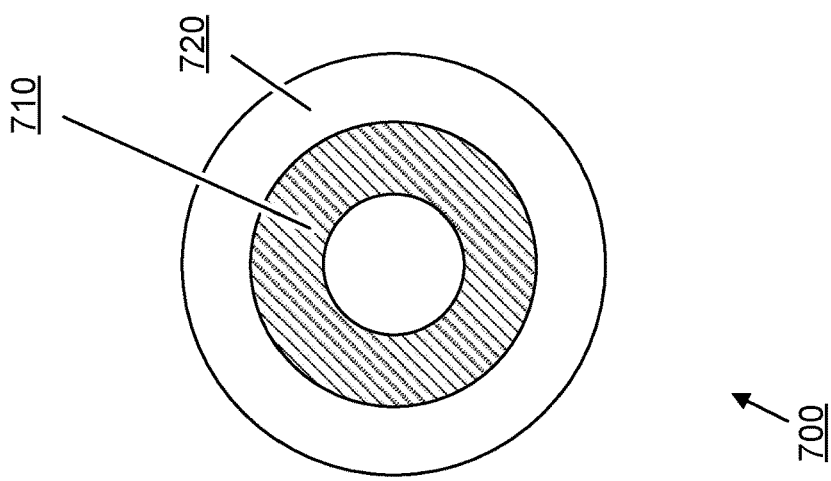
Figure 7A:
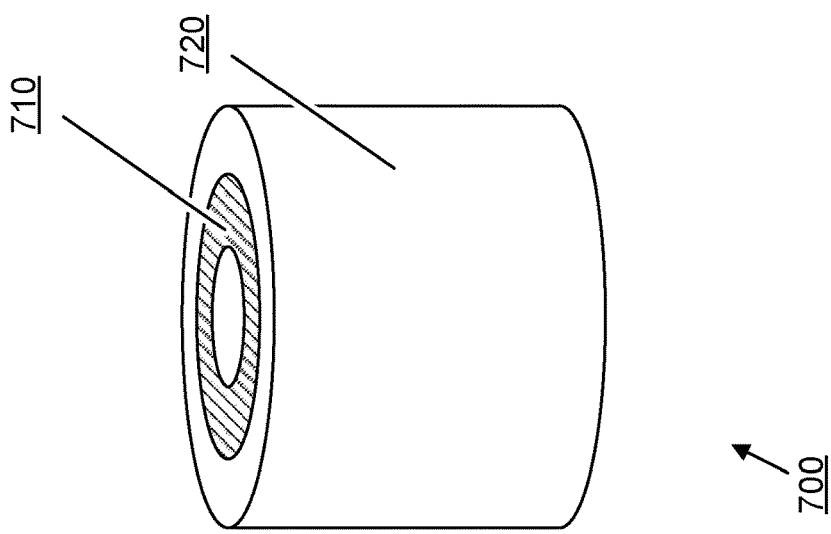

Referring now to FIGS. 6A, 6B and 6C, a particular implementation of a boardside unitary body 600 shows an interior elastomer with a triangular geometrically widened area 610 and outer elastomer 620. Likewise, FIGS. 7A, 7B and 7C illustrates another implementation of a boardside unitary body 700 showing interior elastomer semi-circular widening 710, also referred to as a "bulging barrel" cross-section next to outer elastomer 720. When a semi-circular area within a spring has a softer durometer, a skater beneficially gains control during turns.

Figure 8C:
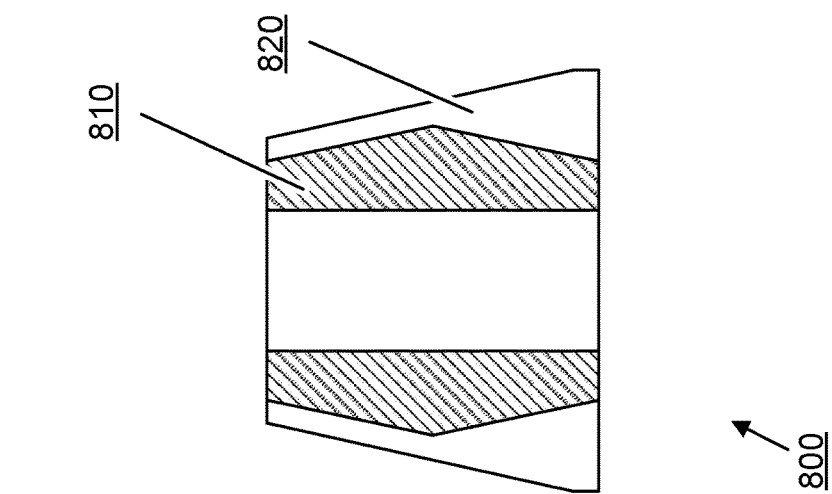
FIGS. 8A, 8B and 8C illustrate a particular implementation of roadside unitary body showing interior elastomer triangular widening 810 in accordance with an embodiment of the present application.
Figure 8B:
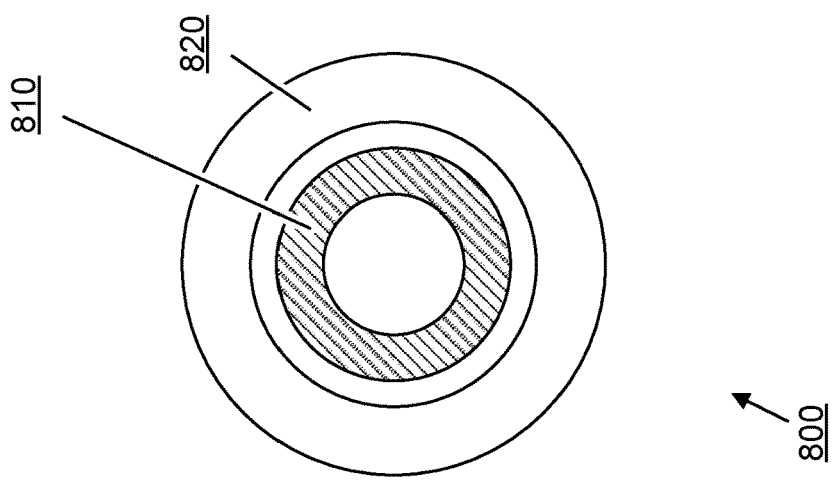
Figure 8A:
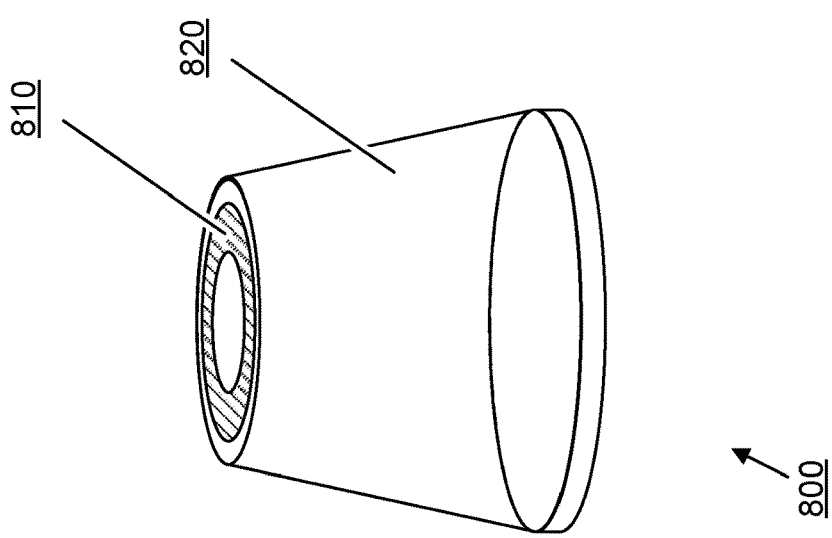
Figure 9C:
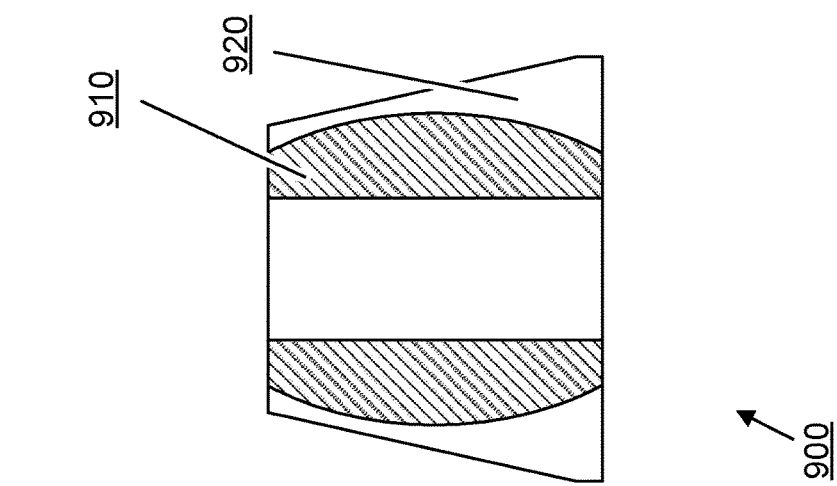
FIGS. 9A, 9B and 9C illustrate a particular implementation of a boardside unitary body showing interior elastomer semi-circular widening 910 in accordance with an embodiment of the present application.
Figure 9B:
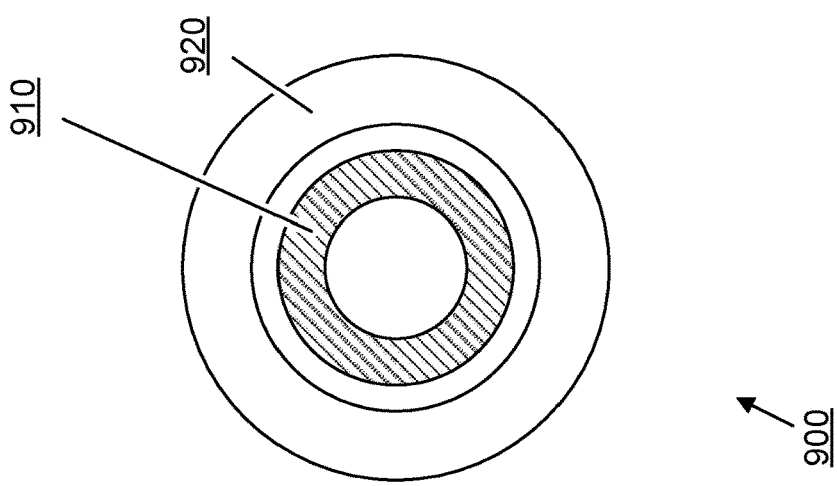
Figure 9A:
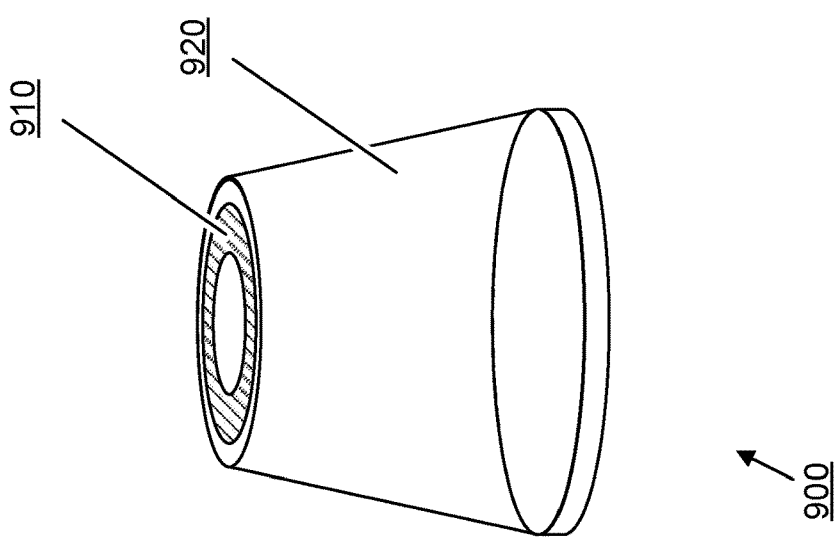

FIGS. 8A, 8B and 8C illustrates a triangular geometrically widened area 810 on a roadside unitary body 800. Thus, widened interior area 810 and exterior elastomer 820 together form unitary body 800. FIGS. 9A, 9B and 9C illustrate the roadside "bulging barrel" cross-section 910 with exterior elastomer 920 to form a roadside portion 900.

FIGS. 6A, 6B and 6C through FIGS. 9A, 9B and 9C illustrate spring portions with widened cross-sections that provide a center elastomer that, in one embodiment, can be of a softer durometer to provide a controlled variable rate spring profile.

Figure 10C:
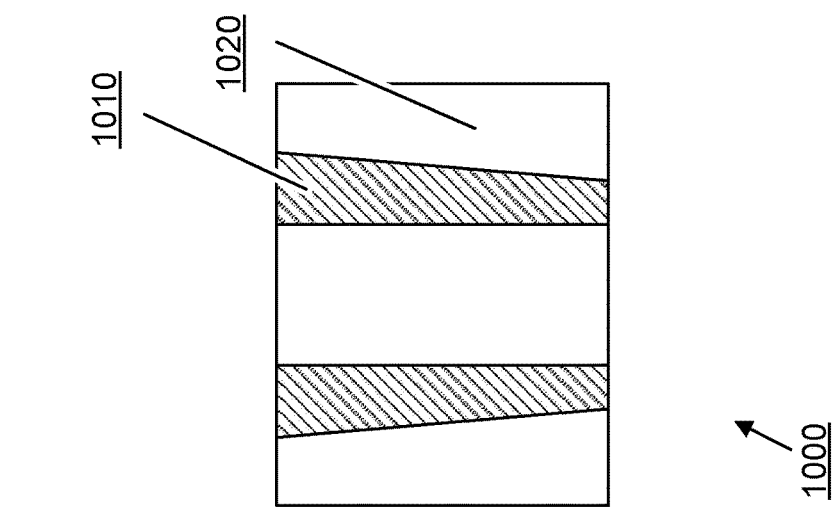
FIGS. 10A, 10B and 10C illustrate a particular implementation of a boardside unitary body showing interior elastomer geometric rhombus-like asymmetric widening 1010 in accordance with an embodiment of the present application.
Figure 10B:
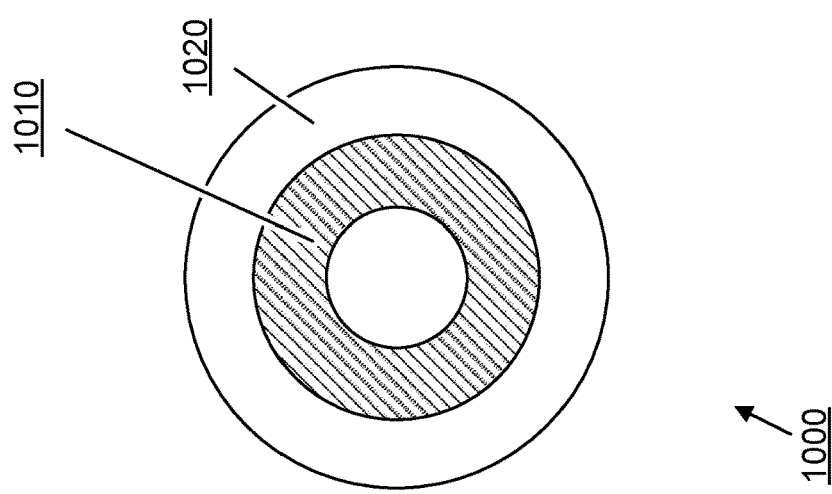
Figure 10A:
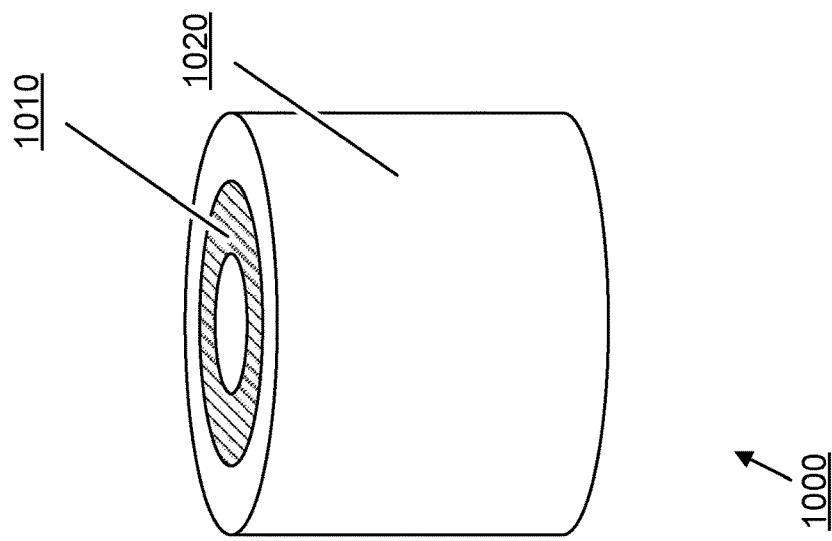
Figure 11C:
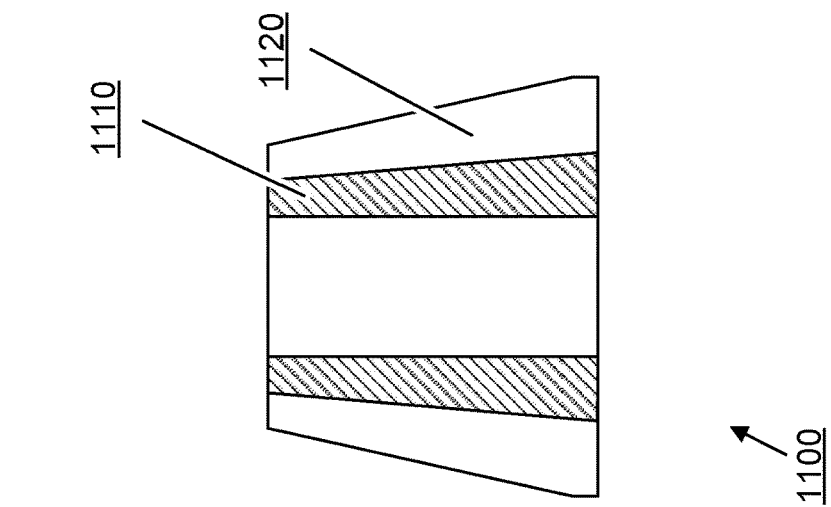
FIGS. 11A, 11B and 11C illustrate a particular implementation of a roadside unitary body showing interior elastomer geometric rhombus-like asymmetric widening 1110 in accordance with an embodiment of the present application.
Figure 11B:
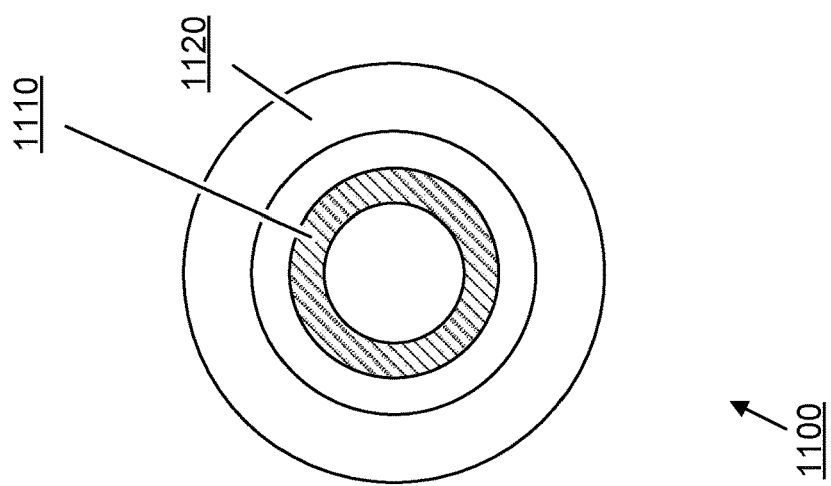
Figure 11A:
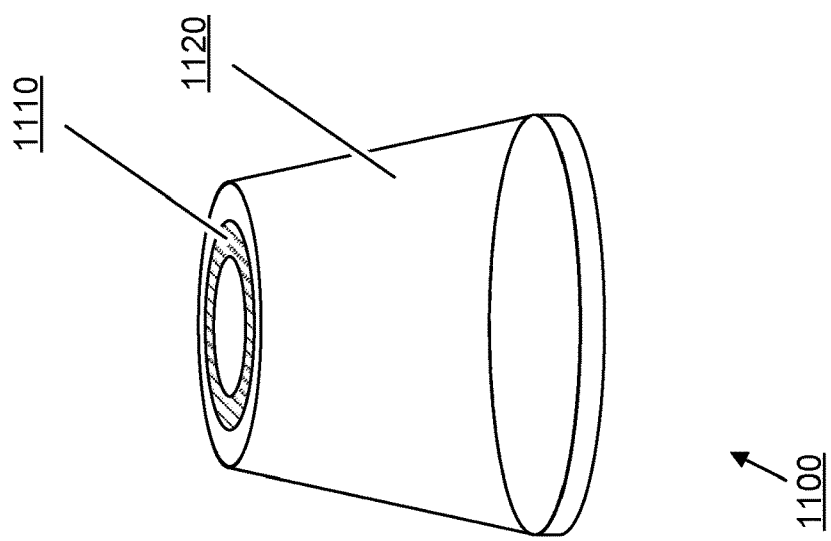

Another embodiment is shown in FIGS. 10A, 10B and 10C combined with FIGS. 11A, 11B and 11C, which shown a boardside unitary body showing interior elastomer geometric rhombus-like asymmetric cross-section 1010 and exterior elastomer 1020 on unitary body 1000; and, in FIGS. 11A, 11B and 11C a roadside unitary body 1100 showing interior elastomer geometric rhombus-like asymmetric widening 1110 and exterior elastomer 1120.

In an embodiment, having a narrower softer interior durometer 1010 and 1110 asymmetry can enhance vibrational damping.

Figure 12C:
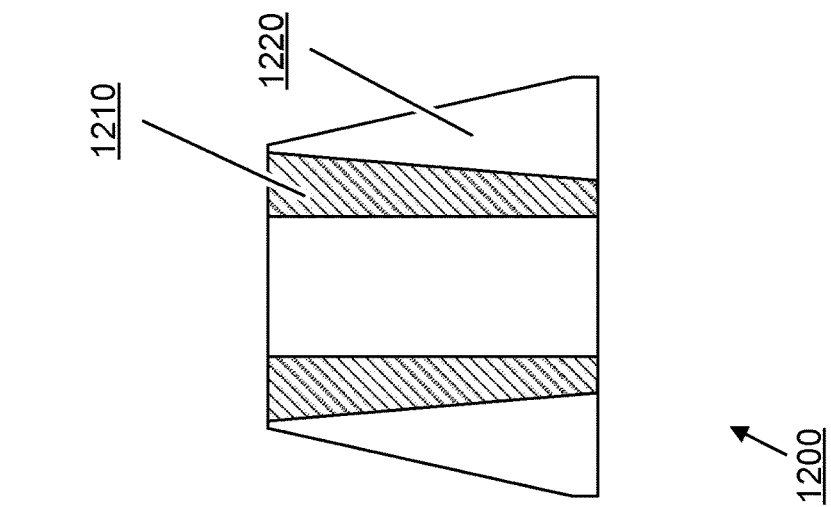
FIGS. 12A, 12B and 12C illustrate a particular implementation of a roadside unitary body showing interior elastomer geometric rhombus-like asymmetric widening 1210 in accordance with an embodiment of the present application.
Figure 12B:
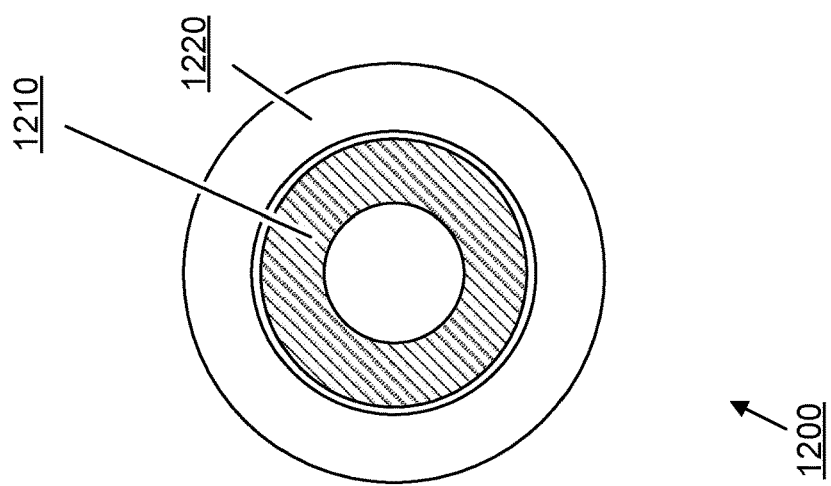
Figure 12A:
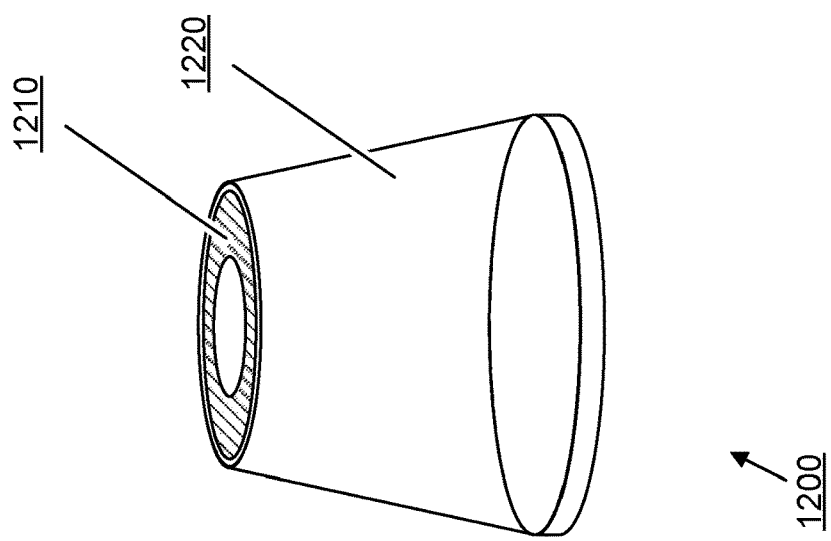

FIGS. 12A, 12B and 12C illustrate another embodiment of a roadside unitary body showing interior elastomer geometric rhombus-like asymmetric widening 1210 and exterior elastomer 1220 of unitary body 1200. Unlike FIG. 11C, FIG. 12C shows a wider interior elastomer at the bottom of the roadside unitary body 1200 (the narrowed portion of the frustrum portion), which provides more stability and control for turns and unique variable-rate spring properties.

Referring now to FIGS. 13A, 13B and 13C, an embodiment of a boardside unitary body 1300 shows an interior elastomer geometric triangular cross-section with symmetric narrowing 1310 and exterior elastomer 1320. In one embodiment, the roadside and boardside unitary bodies can be of different geometries such that an interior geometry 1310 on a boardside unitary body 1300 is combined with a roadside unitary body 1200 with an interior cross-section with a rhombus-like asymmetric widening 1210. Such a combination spring can be beneficial for steering at high and low speed turns and unique variable-rate spring properties such as a steering resistance profile.

Referring to FIGS. 14A, 14B and 14C a boardside unitary body 1400 shows interior elastomer with an hourglass symmetric cross-section shape 1410 and exterior elastomer 1420 in accordance with an embodiment.

The hourglass symmetric cross-section boardside unitary body 1400 shown in FIG. 14C can be combined with a roadside unitary body 1500 shown in FIGS. 15A, 15B and 15C showing a triangular narrowed interior elastomer cross-section area 1510 and exterior cross-section 1520.

Figure 16C:
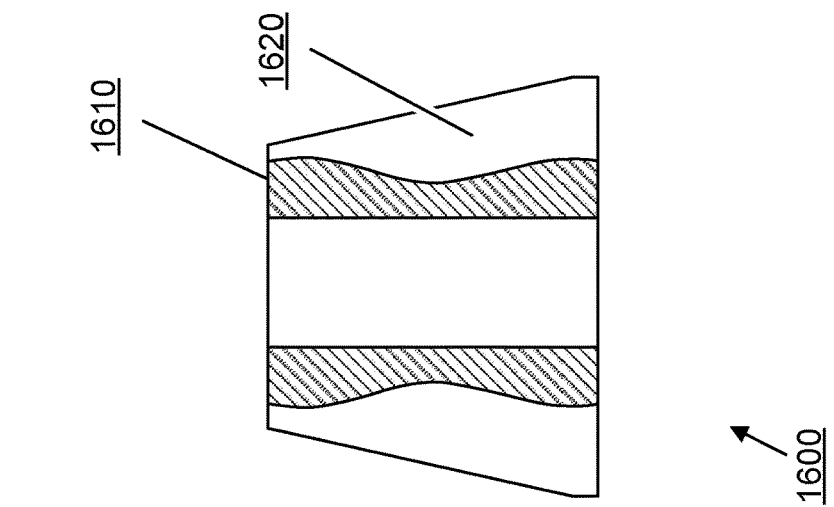
FIGS. 16A, 16B and 16C illustrate a particular implementation of a roadside unitary body showing interior elastomer with a dual hourglass symmetric cross-section area 1610 in accordance with an embodiment of the present application.
Figure 16B:
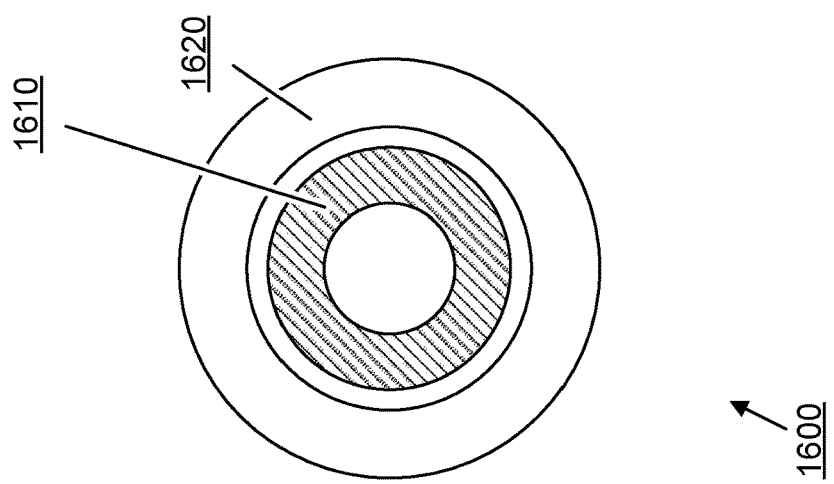
Figure 16A:
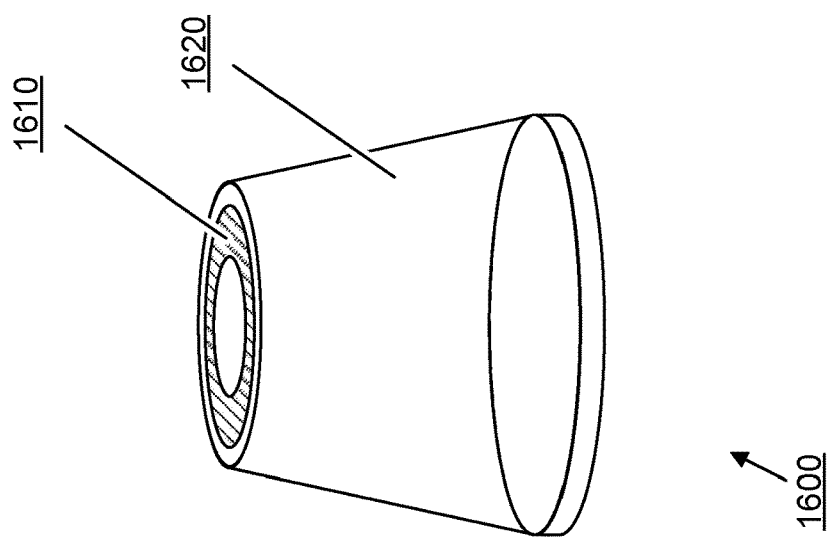

In another embodiment, boardside unitary body 1400 shown in FIG. 14C can be combined with roadside unitary body 1600 shown in FIGS. 16A, 16B and 16C, which illustrate a particular implementation of a roadside unitary body 1600 showing interior elastomer with an hourglass symmetric cross-section area 1610 and exterior elastomer 1620 in accordance with an embodiment of the present application.

Thus, as shown, a variable-rate elastomeric steering control spring in different embodiments can have a same cross-section in boardside unitary body and roadside unitary body or can have different cross-sections. Each skateboard has two skate trucks, a forward and a rear skate truck. Thus, in one embodiment, the forward skate truck and the rear skate truck have different cross-section interior geometries. Accordingly, the maximum number of different geometries can be four different interior geometries, which can be implemented by a skater in a modular fashion according to the necessities of the skateboarder.

Figure 17C:
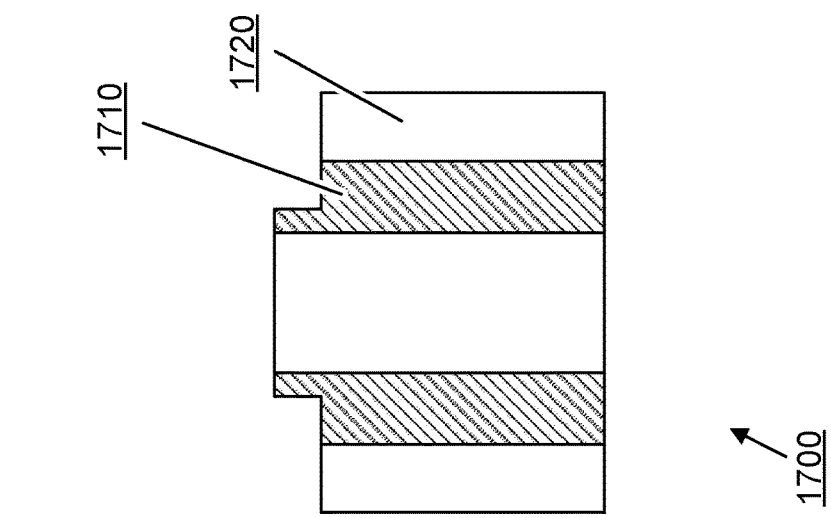
FIGS. 17A, 17B and 17C illustrate a particular implementation of a boardside unitary body showing partially lengthened interior elastomer cross-section area 1710 as compared to the exterior elastomer in accordance with an embodiment of the present application.
Figure 17B:
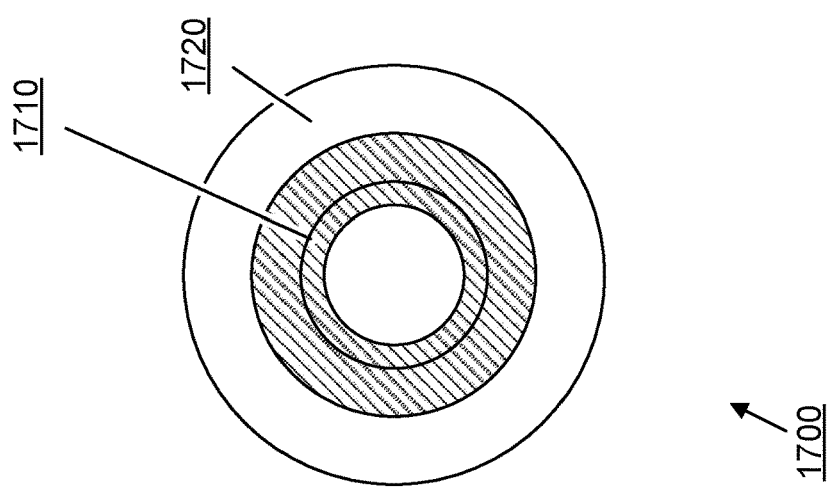
Figure 17A:
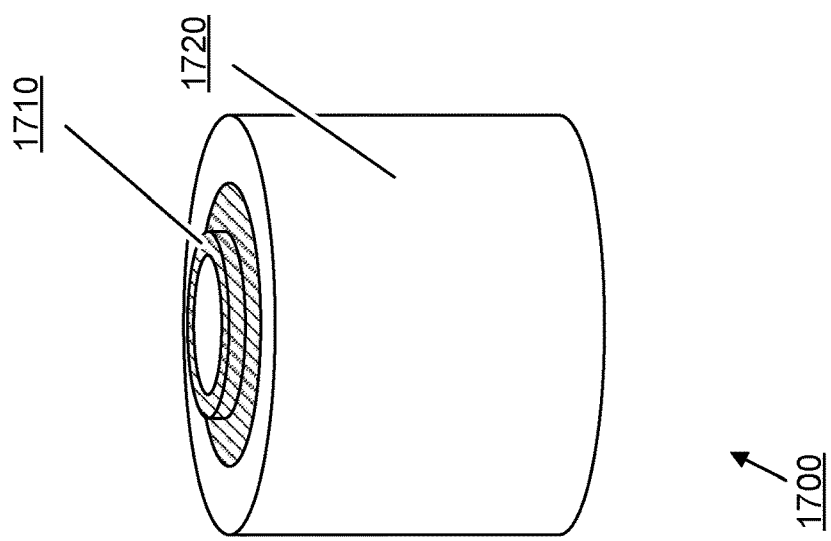
Figure 18C:
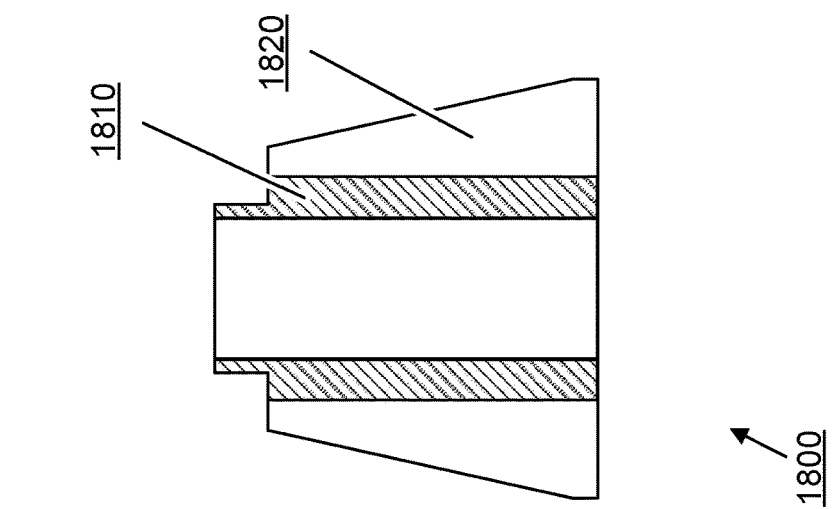
FIGS. 18A, 18B and 18C illustrate a particular implementation of a roadside unitary body showing partially lengthened bottom end interior elastomer 1810 in accordance with an embodiment of the present application.
Figure 18B:
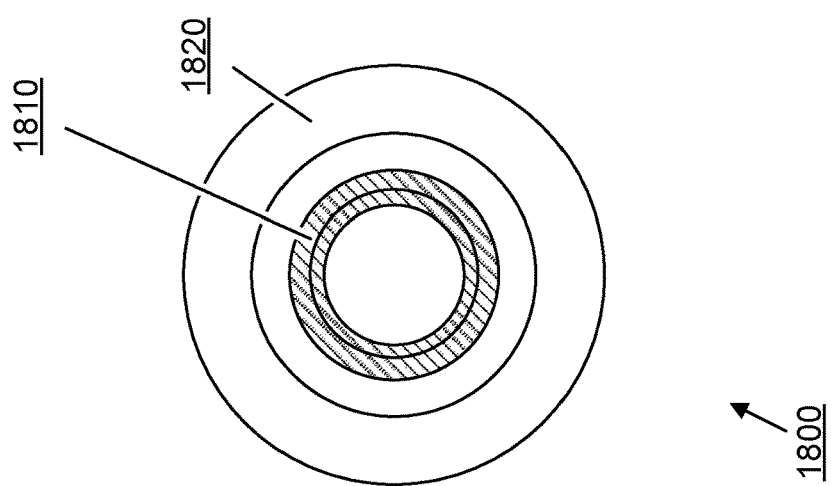
Figure 18A:
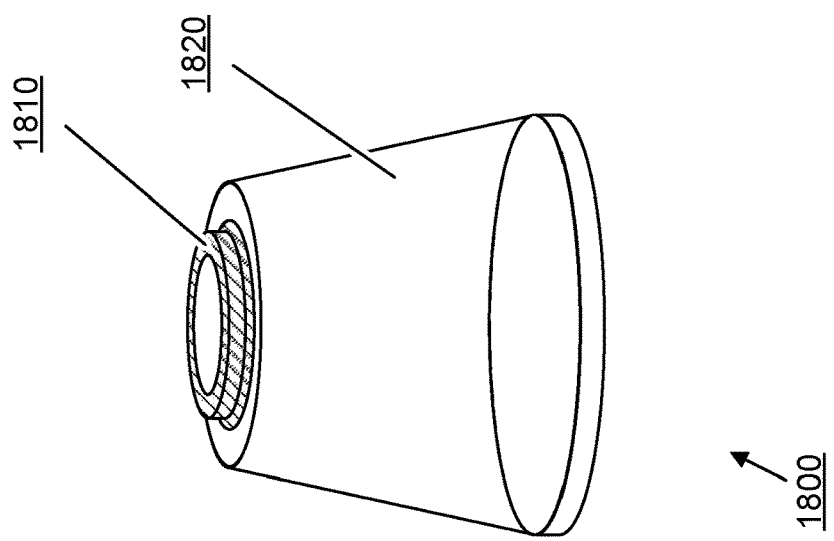

Referring now to FIGS. 17A, 17B and 17C, another embodiment 1700 is directed to interior elastomers 1710 that are partially lengthened as compared to an exterior elastomer. FIGS. 17A, 17B and 17C illustrate a boardside unitary body 1700 showing partially lengthened interior elastomer cross-section area 1710 and exterior elastomer 1720. FIGS. 18A, 18B and 18C illustrate a complimentary roadside unitary body 1800 showing partially lengthened bottom end interior elastomer 1810, and exterior elastomer 1820 in accordance with an embodiment. The extended partial interior elastomer 1810 beneficially reduces noise at a washer component or lock nut coupling a kingpin at the roadside unitary body. A washer fitting over the extended elastomer can eliminate noise or vibration that could otherwise occur.

Figure 19C:
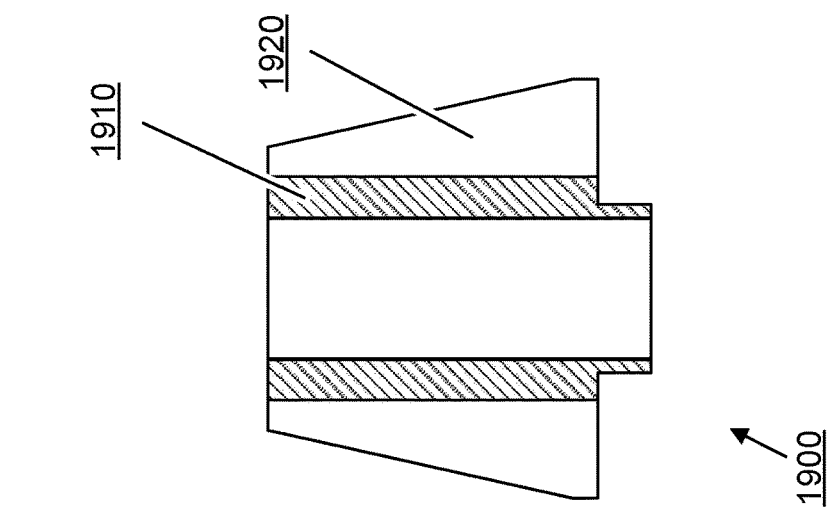
FIGS. 19A, 19B and 19C illustrate a particular implementation of a roadside unitary body showing partially lengthened upper end interior elastomer 1910 in accordance with an embodiment of the present application.
Figure 19B:
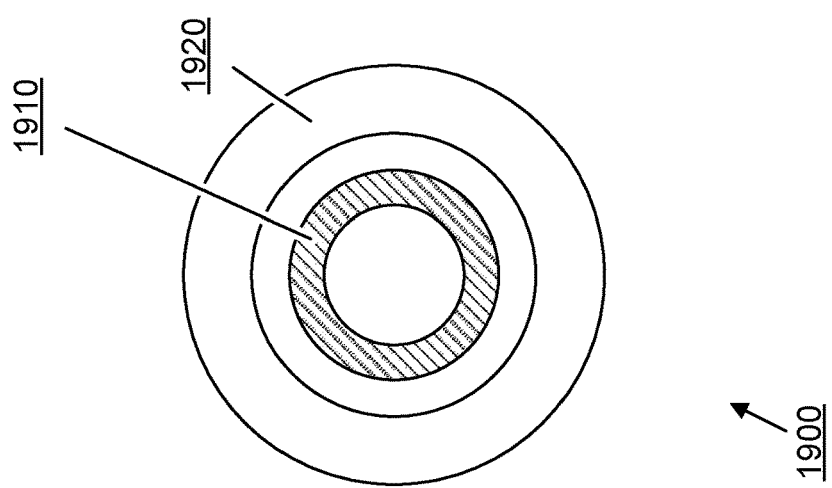
Figure 19A:
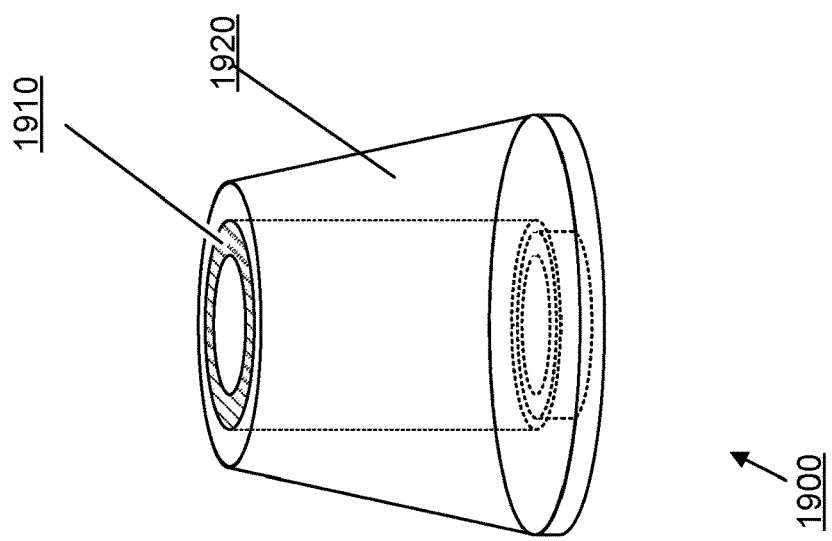
Figure 21C:
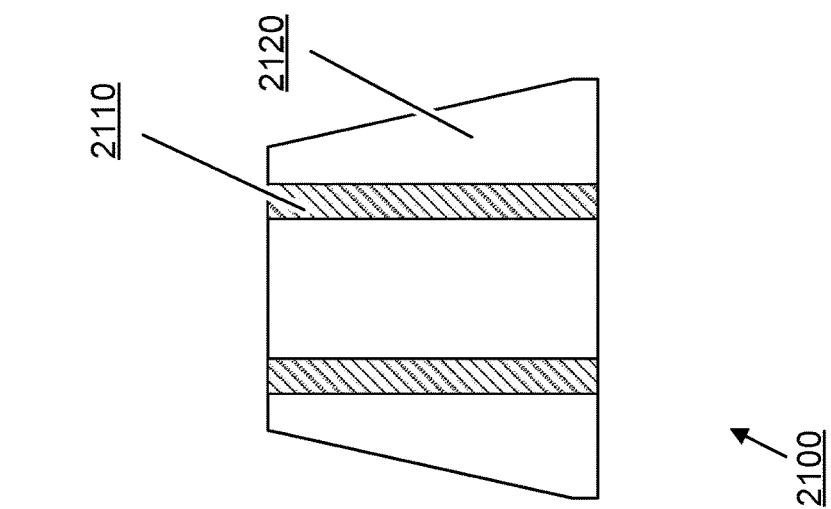
FIGS. 21A, 21B and 21C illustrate an implementation of a roadside unitary body showing interior elastomer 2110 with rectangular cross-section in accordance with an embodiment of the present application.
Figure 21B:
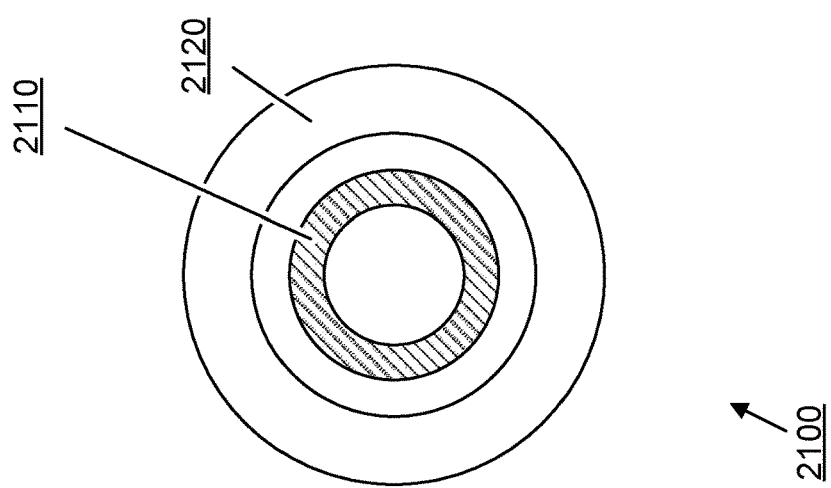
Figure 21A:
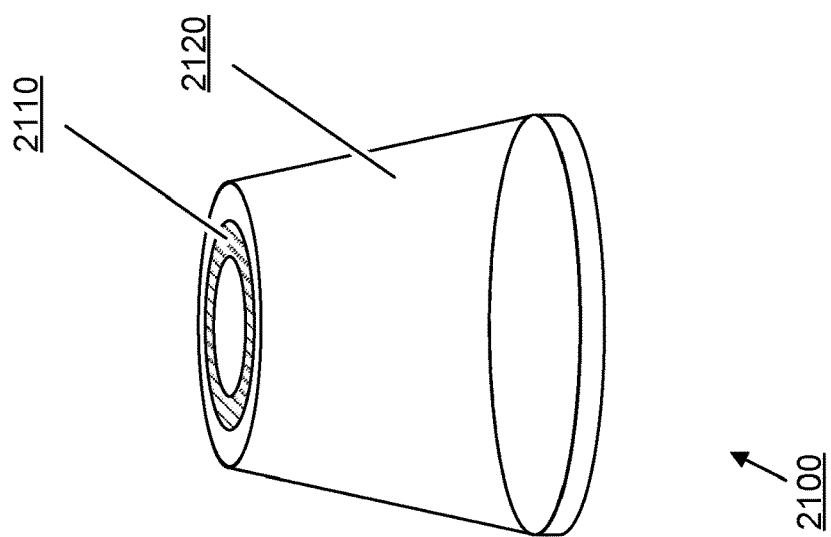

Likewise, FIGS. 19A, 19B and 19C illustrate a roadside unitary body 1900 showing partially lengthened upper end interior elastomer 1910 and exterior elastomer 1920. As shown, the partially lengthened portion 1910 can be either near the bottom of the skate truck, or can be closer to the board of the skate truck. The partially lengthened portion 1910 uniquely enables spring to engage the kingpin with more contact about the kingpin. As shown, the unitary bodies have an extended lengthened portion on the bottom of a roadside unitary body 1900. In one exemplary embodiment, the unitary body of FIGS. 17A, 17B and 17C is used together with the unitary body of FIGS. 19A, 19B and 19C. The respective lengthened interior portions in one embodiment meet in the middle along an axle hanger thereby taking up space that would otherwise be between the boardside unitary body and the roadside unitary body. For example, the lengthened interior portions can abut from either side inside a bushing seat ring of a kingpin. The extension of the interior elastomer thereby limits side-to-side slop of an axel hanger, which can be beneficial for racing skateboards operating at high gravitational g-forces.

Referring now to FIGS. 20A, 20B and 20C and FIGS. 21A, 21B and 21C, the cross-section views of the two types of durometers illustrates an implementation of a boardside unitary body 2000 and 2100 with interior elastomer 2010 and exterior elastomer 2020 with rectangular cross-section and a roadside unitary body showing interior elastomer 2110 and exterior elastomer 2120 with rectangular cross-section in accordance with an embodiment.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention. While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

What is claimed is:

1. A variable-rate elastomeric steering control spring for a skate truck, comprising:
    a king pin boardside unitary body formed of an exterior first elastomer having a first durometer on the Shore A scale, and an interior second elastomer coupled to the first elastomer and extending at least a length of the exterior first elastomer, the second elastomer having a second durometer on the Shore "A" scale and a through hole disposed to receive a kingpin of the skate truck;
    a king pin roadside unitary body formed of an exterior third elastomer having a third durometer on the Shore A scale, and an interior fourth elastomer coupled to the third elastomer and extending at least a length of the exterior third elastomer, the interior fourth elastomer having a fourth durometer on the Shore A scale and a through hole disposed to receive the kingpin; and
    wherein the first, second, third and fourth elastomers comprise at least two durometers on the Shore A scale between 65 A and 100 A to enable the king pin boardside unitary body and the king pin roadside unitary body to form the variable-rate elastomeric steering control spring when disposed on the king pin of the skate truck.

2. The variable-rate elastomeric steering control spring of claim 1, wherein the skate truck includes a seat to receive a distal end of the king pin boardside unitary body and a proximal end of the king pin roadside unitary body and allow for compression of the variable-rate elastomeric steering control spring.

3. The variable-rate elastomeric steering control spring of claim 1, wherein the king pin boardside unitary body has a cylindrical shape and the roadside unitary body has a frustrum shape.

4. The variable-rate elastomeric steering control spring of claim 1, wherein the interior elastomers of both the king pin boardside unitary bodies and the king pin roadside unitary bodies have shapes with cross-sections consisting of at least one of the following: hourglass, triangular, rectangular, semi-circular, asymmetric, and rhombus.

5. The variable-rate elastomeric steering control spring of claim 4, wherein the shape of the interior elastomer and exterior elastomers functionally affects turning control of the skate truck.

6. The variable-rate elastomeric steering control spring of claim 4, wherein the boardside and roadside interior elastomer shapes provide a non-linear steering control of the skate truck.

7. The variable-rate elastomeric steering control spring of claim 1, wherein the first and third durometers are between 85 A and 100 A of the Shore A scale.

8. The variable-rate elastomeric steering control spring of claim 1, wherein the second and fourth durometers are between 65 A and 90 A of the Shore A scale.

9. The variable-rate elastomeric steering control spring of claim 1, wherein the first, second, third and fourth elastomers are of four different durometers of between 65 A and 100 A of the Shore A scale.

10. The variable-rate elastomeric steering control spring of claim 1, wherein the king pin boardside unitary body further comprises a fifth elastomer disposed between the first and the second elastomers, the fifth elastomer having a durometer of between 65 A and 100 A of the Shore A scale.

11. The variable-rate elastomeric steering control spring of claim 1, wherein the king pin roadside unitary body further comprises a sixth elastomer disposed between the third and the fourth elastomers, the sixth elastomer having a durometer of between 65 A and 100 A of the Shore A scale.

12. A skateboard comprising:
a deck;
at least two skate trucks coupled to the deck, each skate truck including:
an axle;
a mounting bracket including a king pin protruding down from the mounting bracket, the king pin having a variable-rate elastomeric steering control spring including:
a king pin boardside unitary body formed of an exterior first elastomer having a first durometer on the Shore A scale, and an interior second elastomer coupled to the first elastomer and extending at least a length of the exterior first elastomer, the second elastomer having a second durometer on the Shore A scale and a through hole disposed to receive a kingpin of the skate truck;
a king pin roadside unitary body formed of an exterior third elastomer having a third durometer on the Shore A scale, and an interior fourth elastomer coupled to the third elastomer and extending at least a length of the exterior third elastomer, the interior fourth elastomer having a fourth durometer on the Shore A scale and a through hole disposed to receive the kingpin wherein the first, second, third and fourth elastomers of the king pin boardside unitary body and the king pin roadside unitary body form the variable-rate elastomeric steering control spring when disposed on the king pin of the skate truck.

13. The skateboard of claim 12 wherein each of the at least two skate trucks includes a seat to receive a distal end of the king pin boardside unitary body and a proximal end of the king pin roadside unitary body and allow for compression of the variable-rate elastomeric steering control spring.

14. The skateboard of claim 12 wherein the king pin boardside unitary body has a cylindrical shape and the king pin roadside unitary body has a frustrum shape.

15. The skateboard of claim 12 wherein the interior elastomers of both the king pin boardside unitary bodies and the king pin roadside unitary bodies have shapes with cross-sections consisting of at least one of the following shapes: hourglass, triangular, rectangular, circular, asymmetric, and rhombus.

16. The variable-rate elastomeric steering control spring of claim 15, wherein the shape of the interior elastomer and exterior elastomers functionally affects turning control of the skate truck.

17. The variable-rate elastomeric steering control spring of claim 15, wherein the king pin boardside and the king pin roadside interior elastomer shape provides a non-linear steering control of the skate truck.

18. An apparatus comprising:
a king pin roadside unitary body formed of an exterior elastomer having a durometer on the Shore A scale of between 65 A and 100 A, and an interior elastomer coupled to the exterior elastomer and extending at least a length of the exterior elastomer, the interior elastomer having a durometer on the Shore A scale between 65 A and 100 A and a through hole disposed to receive a kingpin for attaching the king pin roadside unitary body to a skate truck for a skateboard; and
wherein the exterior and interior elastomers comprise at least two durometers on the Shore A scale between 65 A and 100 A to enable the king pin roadside unitary body to form a variable-rate elastomeric steering control spring when disposed on the king pin of the skate truck.

19. The apparatus of claim 18 wherein the king pin roadside unitary body is disposed on the king pin of the skate truck as part of a variable-rate elastomeric steering control spring, wherein the spring includes:
the king pin roadside unitary body; and
a king pin boardside unitary body formed of the exterior elastomer and the interior elastomer coupled to the and extending at least a length of the exterior elastomer and having a through hole disposed to receive the king pin of the skate truck.

20. The apparatus of claim 19 wherein the king pin roadside unitary body or the king pin boardside unitary body is disposed on the king pin of the skate truck and wherein the interior elastomers of both the king pin boardside unitary bodies and the king pin roadside unitary bodies have shapes with cross-sections consisting of at least one of the following: hourglass, triangular, rectangular, semi-circular, asymmetric, and rhombus.

* * * * *